United States Patent
Tso

(10) Patent No.: US 11,647,165 B1
(45) Date of Patent: *May 9, 2023

(54) AUDIO/VIDEO RECORDING AND COMMUNICATION DOORBELL DEVICES INCLUDING TRANSISTOR ASSEMBLIES, AND ASSOCIATED SYSTEMS AND METHODS

(71) Applicant: AMAZON TECHNOLOGIES, INC., Seattle, WA (US)

(72) Inventor: Robert Tso, Hawthorne, CA (US)

(73) Assignee: Amazon Technologies, Inc., Seattle, WA (US)

( * ) Notice: Subject to any disclaimer, the term of this patent is extended or adjusted under 35 U.S.C. 154(b) by 32 days.

This patent is subject to a terminal disclaimer.

(21) Appl. No.: 16/776,104

(22) Filed: Jan. 29, 2020

Related U.S. Application Data

(63) Continuation of application No. 16/138,841, filed on Sep. 21, 2018, now Pat. No. 10,609,344.

(51) Int. Cl.
| | |
|---|---|
| *H04N 7/18* | (2006.01) |
| *G05B 19/02* | (2006.01) |
| *G07C 9/00* | (2020.01) |

(52) U.S. Cl.
CPC .......... *H04N 7/186* (2013.01); *G05B 19/02* (2013.01); *G07C 9/00944* (2013.01); *G05B 2219/2642* (2013.01)

(58) Field of Classification Search
CPC .............. H04N 7/186; G05B 19/02; G05B 2219/2642; G07C 9/00944
See application file for complete search history.

(56) References Cited

U.S. PATENT DOCUMENTS

| | | | |
|---|---|---|---|
| 4,764,953 A | 8/1988 | Chern et al. | |
| 5,428,388 A * | 6/1995 | von Bauer | H04N 7/186 455/67.11 |
| 5,448,290 A | 9/1995 | VanZeeland | |
| 5,612,994 A * | 3/1997 | Chen | H04N 7/186 348/14.01 |
| 5,760,848 A | 6/1998 | Cho | |
| 6,072,402 A | 6/2000 | Kniffin et al. | |

(Continued)

FOREIGN PATENT DOCUMENTS

| | | |
|---|---|---|
| CN | 2585521 | 11/2003 |
| CN | 2585521 Y | 11/2003 |

(Continued)

*Primary Examiner* — Brian P Yenke
*Assistant Examiner* — Sean N. Haiem
(74) *Attorney, Agent, or Firm* — Lee & Hayes, P.C.

(57) ABSTRACT

An audio/video (A/V) recording and communication doorbell device includes a transistor assembly and control circuitry. The transistor assembly is electrically coupled between an input power bus that distributes alternating current (AC) input power and/or direct current (DC) input power, and an output power bus that provides a DC output power for the A/V recording and communication doorbell device. The control circuitry is configured to cause the transistor assembly to convert AC input power and/or DC input power from the input power bus to the DC output power into the output power bus, to provide the DC output power for the A/V recording and communication doorbell device.

23 Claims, 8 Drawing Sheets

(56) References Cited

U.S. PATENT DOCUMENTS

| | | | |
|---|---|---|---|
| 6,175,311 B1* | 1/2001 | Li | H02J 9/062 |
| | | | 307/64 |
| 6,192,257 B1 | 2/2001 | Ray | |
| 6,271,752 B1 | 8/2001 | Vaios | |
| 6,429,893 B1 | 8/2002 | Xin | |
| 6,456,322 B1 | 9/2002 | Marinacci | |
| 6,476,858 B1 | 11/2002 | Ramirez Diaz et al. | |
| 6,633,231 B1 | 10/2003 | Okamoto et al. | |
| 6,658,091 B1 | 12/2003 | Naidoo et al. | |
| 6,753,774 B2 | 6/2004 | Pan et al. | |
| 6,970,183 B1 | 11/2005 | Monroe | |
| 7,062,291 B2 | 6/2006 | Ryley et al. | |
| 7,065,196 B2 | 6/2006 | Lee | |
| 7,085,361 B2 | 8/2006 | Thomas | |
| 7,109,860 B2 | 9/2006 | Wang | |
| 7,193,644 B2 | 3/2007 | Carter | |
| 7,304,572 B2 | 12/2007 | Sheynman et al. | |
| 7,382,249 B2 | 6/2008 | Fancella | |
| 7,450,638 B2 | 11/2008 | Iwamura | |
| 7,643,056 B2 | 1/2010 | Silsby | |
| 7,683,924 B2 | 3/2010 | Oh et al. | |
| 7,683,929 B2 | 3/2010 | Elazar et al. | |
| 7,738,917 B2 | 6/2010 | Ryley et al. | |
| 8,139,098 B2 | 3/2012 | Carter | |
| 8,144,183 B2 | 3/2012 | Carter | |
| 8,154,581 B2 | 4/2012 | Carter | |
| 8,619,136 B2 | 12/2013 | Howarter et al. | |
| 8,780,201 B1 | 7/2014 | Scalisi et al. | |
| 8,823,795 B1 | 9/2014 | Scalisi et al. | |
| 8,842,180 B1 | 9/2014 | Kasmir et al. | |
| 8,872,915 B1 | 10/2014 | Scalisi et al. | |
| 8,937,659 B1 | 1/2015 | Scalisi et al. | |
| 8,941,736 B1 | 1/2015 | Scalisi | |
| 8,947,530 B1 | 2/2015 | Scalisi | |
| 8,953,040 B1 | 2/2015 | Scalisi et al. | |
| 9,013,575 B2 | 4/2015 | Scalisi | |
| 9,049,352 B2 | 6/2015 | Scalisi et al. | |
| 9,053,622 B2 | 6/2015 | Scalisi | |
| 9,058,738 B1 | 6/2015 | Scalisi | |
| 9,060,103 B2 | 6/2015 | Scalisi | |
| 9,060,104 B2 | 6/2015 | Scalisi | |
| 9,065,987 B2 | 6/2015 | Kasmir et al. | |
| 9,094,584 B2 | 7/2015 | Scalisi et al. | |
| 9,113,051 B1 | 8/2015 | Scalisi | |
| 9,113,052 B1 | 8/2015 | Scalisi et al. | |
| 9,118,819 B1 | 8/2015 | Scalisi et al. | |
| 9,142,214 B2 | 9/2015 | Scalisi | |
| 9,160,987 B1 | 10/2015 | Kasmir et al. | |
| 9,165,444 B2 | 10/2015 | Scalisi | |
| 9,172,920 B1 | 10/2015 | Kasmir et al. | |
| 9,172,921 B1 | 10/2015 | Scalisi et al. | |
| 9,172,922 B1 | 10/2015 | Kasmir et al. | |
| 9,179,107 B1 | 11/2015 | Scalisi et al. | |
| 9,179,108 B1 | 11/2015 | Scalisi et al. | |
| 9,179,109 B1 | 11/2015 | Kasmir et al. | |
| 9,196,133 B2* | 11/2015 | Scalisi | G08B 13/19695 |
| 9,197,867 B1 | 11/2015 | Scalisi et al. | |
| 9,230,424 B1 | 1/2016 | Scalisi et al. | |
| 9,237,318 B2 | 1/2016 | Kasmir et al. | |
| 9,247,219 B2 | 1/2016 | Kasmir et al. | |
| 9,253,455 B1 | 2/2016 | Harrison et al. | |
| 9,342,936 B2* | 5/2016 | Scalisi | H04N 7/188 |
| 9,508,239 B1 | 11/2016 | Harrison et al. | |
| 9,736,284 B2 | 8/2017 | Scalisi et al. | |
| 9,743,049 B2 | 8/2017 | Scalisi et al. | |
| 9,769,435 B2* | 9/2017 | Scalisi | G08B 13/19684 |
| 9,786,133 B2 | 10/2017 | Harrison et al. | |
| 9,799,183 B2 | 10/2017 | Harrison et al. | |
| 10,311,685 B1* | 6/2019 | Long | G10K 1/063 |
| 10,609,344 B1* | 3/2020 | Tso | H04N 7/186 |
| 2002/0047646 A1* | 4/2002 | Lys | F21S 4/28 |
| | | | 315/312 |
| 2002/0094111 A1 | 7/2002 | Puchek et al. | |
| 2002/0147982 A1 | 10/2002 | Naidoo et al. | |
| 2003/0043047 A1* | 3/2003 | Braun | G08B 3/10 |
| | | | 340/691.1 |
| 2004/0085205 A1 | 5/2004 | Yeh | |
| 2004/0085450 A1 | 5/2004 | Stuart | |
| 2004/0086093 A1* | 5/2004 | Schranz | H04L 41/06 |
| | | | 379/37 |
| 2004/0095254 A1 | 5/2004 | Maruszczak | |
| 2004/0135686 A1* | 7/2004 | Parker | G08B 13/22 |
| | | | 340/540 |
| 2005/0007451 A1* | 1/2005 | Chiang | G08B 13/19634 |
| | | | 348/143 |
| 2005/0111660 A1 | 5/2005 | Hosoda | |
| 2006/0010199 A1 | 1/2006 | Brailean et al. | |
| 2006/0022816 A1* | 2/2006 | Yukawa | G08B 25/006 |
| | | | 340/521 |
| 2006/0139449 A1* | 6/2006 | Cheng | H04N 7/186 |
| | | | 348/61 |
| 2006/0156361 A1* | 7/2006 | Wang | H04N 7/186 |
| | | | 725/105 |
| 2011/0199799 A1* | 8/2011 | Hui | H02M 7/06 |
| | | | 363/127 |
| 2013/0057695 A1* | 3/2013 | Huisking | H04N 7/186 |
| | | | 348/156 |
| 2014/0265359 A1* | 9/2014 | Cheng | E05B 47/026 |
| | | | 292/144 |
| 2014/0266669 A1* | 9/2014 | Fadell | H05B 47/10 |
| | | | 340/501 |
| 2014/0268956 A1* | 9/2014 | Teren | H02M 7/219 |
| | | | 363/89 |
| 2015/0029335 A1* | 1/2015 | Kasmir | H04N 7/188 |
| | | | 348/143 |
| 2015/0035987 A1* | 2/2015 | Fernandez | H04N 7/186 |
| | | | 348/156 |
| 2015/0120015 A1* | 4/2015 | Fadell | G06Q 10/0631 |
| | | | 700/90 |
| 2015/0156031 A1* | 6/2015 | Fadell | G08B 19/005 |
| | | | 700/276 |
| 2015/0161856 A1 | 6/2015 | Wilson et al. | |
| 2015/0319411 A1* | 11/2015 | Kasmir | H04N 7/188 |
| | | | 348/143 |
| 2016/0284170 A1* | 9/2016 | Kasmir | G08B 7/06 |
| 2017/0116835 A1* | 4/2017 | Child | G08B 21/0272 |
| 2017/0220872 A1* | 8/2017 | Child | G08B 13/196 |
| 2017/0272652 A1* | 9/2017 | Siminoff | H04N 5/23206 |
| 2018/0075400 A1* | 3/2018 | Scalisi | G07C 9/28 |
| 2018/0129885 A1* | 5/2018 | Potter | G06K 9/00288 |
| 2019/0056132 A1* | 2/2019 | Warren | F24F 11/62 |
| 2019/0148984 A1* | 5/2019 | Bevelacqua | H02J 50/23 |
| | | | 307/104 |
| 2019/0149775 A1* | 5/2019 | Alamgir | G08B 13/1966 |
| | | | 348/143 |

FOREIGN PATENT DOCUMENTS

| | | |
|---|---|---|
| CN | 2792061 | 6/2006 |
| CN | 2792061 Y | 6/2006 |
| EP | 0944883 B1 | 6/1998 |
| EP | 0944883 | 9/1999 |
| EP | 1480462 | 11/2004 |
| EP | 1480462 A1 | 11/2004 |
| GB | 2286283 | 8/1995 |
| GB | 2286283 A | 8/1995 |
| GB | 2354394 | 3/2001 |
| GB | 2354394 A | 3/2001 |
| GB | 2357387 | 6/2001 |
| GB | 2357387 A | 6/2001 |
| GB | 2400958 | 10/2004 |
| GB | 2400958 A | 10/2004 |
| JP | 2001-103463 A2 | 4/2001 |
| JP | 2001103463 | 4/2001 |
| JP | 2002-033839 A2 | 1/2002 |
| JP | 2002033839 | 1/2002 |
| JP | 2002-125059 A2 | 4/2002 |
| JP | 2002125059 | 4/2002 |
| JP | 2002-342863 A2 | 11/2002 |
| JP | 2002-344640 A2 | 11/2002 |
| JP | 2002342863 | 11/2002 |

(56) References Cited

FOREIGN PATENT DOCUMENTS

| | | |
|---|---|---|
| JP | 2002344640 | 11/2002 |
| JP | 2002-354137 A2 | 12/2002 |
| JP | 2002-368890 A2 | 12/2002 |
| JP | 2002354137 | 12/2002 |
| JP | 2002368890 | 12/2002 |
| JP | 2003-283696 A2 | 10/2003 |
| JP | 2003283696 | 10/2003 |
| JP | 2004-128835 A | 4/2004 |
| JP | 2004128835 | 4/2004 |
| JP | 2005-341040 A | 12/2005 |
| JP | 2005341040 | 12/2005 |
| JP | 2006-147650 A | 6/2006 |
| JP | 2006147650 | 6/2006 |
| JP | 2006-262342 A | 9/2006 |
| JP | 2006262342 | 9/2006 |
| JP | 09-008925 A | 1/2009 |
| WO | WO9839894 | 9/1998 |
| WO | WO 199839894 A1 | 9/1998 |
| WO | WO0113638 | 2/2001 |
| WO | WO 0113638 A1 | 2/2001 |
| WO | WO0193220 | 12/2001 |
| WO | WO 200193220 A1 | 12/2001 |
| WO | WO02085019 | 10/2002 |
| WO | WO 2002085019 A1 | 10/2002 |
| WO | WO03028375 | 4/2003 |
| WO | WO 2003028375 A1 | 4/2003 |
| WO | WO03096696 | 11/2003 |
| WO | WO 2003096696 A1 | 11/2003 |
| WO | WO2006038760 | 4/2006 |
| WO | WO 2006038760 A1 | 4/2006 |
| WO | WO2006067782 | 6/2006 |
| WO | WO 2006067782 A1 | 6/2006 |
| WO | WO 2007125143 A1 | 8/2007 |
| WO | WO2007125143 | 11/2007 |

* cited by examiner

700

```
┌─────────────────────────────┐
│   DETECT FIRST DC VOLTAGE   │
│             702             │
└─────────────────────────────┘
              │
              ▼
┌─────────────────────────────┐
│  DETECT SECOND DC VOLTAGE   │
│             704             │
└─────────────────────────────┘
              │
              ▼
         ╱─────────╲
   YES  ╱ IS THE FIRST DC ╲  NO
  ◄────╱ VOLTAGE GREATER THAN ╲────►
        ╲  THE SECOND DC   ╱
         ╲   VOLTAGE?    ╱
          ╲    706     ╱
           ╲─────────╱
  │                           │
  ▼                           ▼
┌──────────────┐      ┌──────────────┐
│ PROVIDE FIRST DC │      │ PROVIDE SECOND DC │
│      PATH       │      │       PATH        │
│       708       │      │       710         │
└──────────────┘      └──────────────┘
```

FIGURE 7

AUDIO/VIDEO RECORDING AND COMMUNICATION DOORBELL DEVICES INCLUDING TRANSISTOR ASSEMBLIES, AND ASSOCIATED SYSTEMS AND METHODS

RELATED APPLICATIONS

This application is a continuation of U.S. patent application Ser. No. 16/138,841, filed on Sep. 21, 2018, which is incorporated herein by reference.

TECHNICAL FIELD

The present embodiments relate to audio/video (A/V) recording and communication devices, including A/V recording and communication doorbells, security cameras, and floodlight controllers. In particular, the present embodiments relate to improvements in the functionality of A/V recording and communication devices that strengthen the ability of such devices to reduce crime and enhance public safety.

BACKGROUND

Home security is a concern for many homeowners and renters. Those seeking to protect or monitor their homes often wish to have video and audio communications with visitors, for example, those visiting an external door or entryway. A/V recording and communication devices, such as doorbells, provide this functionality, and can also aid in crime detection and prevention. For example, audio and/or video captured by an A/V recording and communication device can be uploaded to the cloud and recorded on a remote server. Subsequent review of the A/V footage can aid law enforcement in capturing perpetrators of home burglaries and other crimes. Further, the presence of one or more A/V recording and communication devices on the exterior of a home, such as a doorbell unit at the entrance to the home, acts as a powerful deterrent against would-be burglars.

SUMMARY

The various embodiments of the present audio/video (A/V) recording and communicating doorbell devices including transistor assemblies have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One aspect of the present embodiments includes the realization that significant power may be dissipated in a full-wave rectifier circuit of an A/V recording and communication doorbell device. In particular, an A/V recording and communication doorbell device typically includes a full-wave rectifier circuit as part of a power supply of the doorbell device. In applications where the A/V recording and communication doorbell device is powered from an alternating current (AC) electrical power source, e.g., a transformer external to the A/V recording and communication doorbell device, the full-wave rectifier circuit converts AC input power from an input power bus to a direct current (DC) output power into an output power bus, to power the A/V recording and communication doorbell device. In applications where the A/V recording and communication doorbell device is powered from a DC electrical power source, e.g., a photovoltaic device or a battery, the full-wave rectifier circuit provides a DC path between the input power bus and the output power bus, to power the A/V recording and communication doorbell device.

An example full-wave rectifier circuit includes four diodes, and each of the four diodes has a forward voltage drop of approximately 0.6 volt when current is flowing through the diode. This voltage drop can cause significant power loss. For example, consider a hypothetical scenario where the full-wave rectifier circuit converts AC input power from an input power bus to a DC output power, where current flowing through the full-wave rectifier circuit has a root-mean-square (RMS) magnitude of one ampere. Current will flow through all four of the diodes in this example, and approximately 2.4 watts (W) of power will be dissipated in the full-wave rectifier circuit, due to the diode forward voltage drop. This power dissipation may necessitate that the A/V recording and communication doorbell device include one or more cooling devices, such as heatsink(s). The cooling devices may increase cost and/or size of the A/V recording and communication doorbell device. Additionally, power dissipation in the full-wave rectifier circuit may leave insufficient power for the A/V recording and communication doorbell device to operate under certain conditions, particularly in cases where the doorbell device is powered from an electrical power source of limited capacity, e.g., from a photovoltaic device or a battery.

Furthermore, the voltage drop across each diode may result in insufficient power supply voltage on the output power bus when an input electrical power source has a small voltage magnitude, e.g., when the input electrical power source is a photovoltaic device or a battery. For example, consider a hypothetical scenario where the full-wave rectifier circuit converts AC input power from the input power bus to a DC output power. The forward voltage drop across the full-wave rectifier circuit will reduce peak voltage on the output power bus by approximately 1.2 volts, which may result in insufficient power supply voltage for the A/V recording and communication doorbell device under some conditions.

The present embodiments solve these problems, for example, by providing A/V recording and communication doorbell devices including a transistor assembly. In some embodiments, the transistor assembly replaces a full-wave rectifier circuit, while in some other embodiments, the transistor assembly supplements a full-wave rectifier circuit. The transistor assembly is configured, for example, to emulate a full-wave rectifier circuit, and/or to provide a DC path between an input power bus and an output power bus. The transistor assembly includes transistors, e.g., field effect transistors, which may have significantly lower forward voltage drop than diodes. Consequently, the A/V recording and communication doorbell devices including a transistor assembly may dissipate significantly less power than conventional A/V recording and communication doorbell devices. Additionally, the A/V recording and communication doorbell devices including a transistor assembly may operate with lower input voltages than conventional A/V recording and communication doorbell devices.

In a first aspect, an A/V recording and communication doorbell device includes a transistor assembly electrically coupled between an input power bus that distributes at least one of an alternating current (AC) input power and a direct current (DC) input power, and an output power bus that provides a DC output power for the A/V recording and communication doorbell device. The A/V recording and communication doorbell device further includes control circuitry configured to cause the transistor assembly to convert the at least one of the AC input power and the DC input power from the input power bus to the DC output power into the output power bus, to provide the DC output power for the A/V recording and communication doorbell device.

In an embodiment of the first aspect, the control circuitry is further configured to detect a presence of AC voltage on the input power bus, and in response to detecting the presence of the AC voltage on the input power bus, cause the transistor assembly to emulate a bridge rectifier to convert the AC input power from the input power bus to the DC output power into the output power bus.

In another embodiment of the first aspect, the control circuitry is further configured to cause the transistor assembly to emulate a diode electrically coupled across the input power bus to rectify the AC input power into a rectified DC output power to a signaling device.

In another embodiment of the first aspect, the A/V recording and communication doorbell device further includes a button configured to be pressed to cause a signaling device to activate, wherein the control circuitry is further configured to cause the transistor assembly to short-circuit the input power bus, in response to the button being pressed, to cause the signaling device to activate.

In another embodiment of the first aspect, the control circuitry is further configured to detect a presence of DC voltage on the input power bus, and in response to detection of the DC voltage on the input power bus, cause the transistor assembly to provide a DC path between the input power bus and the output power bus.

In another embodiment of the first aspect, the input power bus includes a first node and a second node, and the output power bus includes a third node and a fourth node. The transistor assembly includes a first transistor electrically coupled between the first node and the third node, a second transistor electrically coupled between the second node and the third node, a third transistor electrically coupled between the first node and the fourth node, and a fourth transistor electrically coupled between the second node and the fourth node.

In another embodiment of the first aspect, the control circuitry is further configured to cause the first transistor and the fourth transistor to operate in their respective on-states, and cause the second transistor and the third transistor to operate in their respective off-states, in response to a first DC voltage at the first node being greater than a second DC voltage at the second node.

In another embodiment of the first aspect, the control circuitry is further configured to cause the first transistor and the fourth transistor to operate in their respective off-states, and cause the second transistor and the third transistor to operate in their respective on-states, in response to the first DC voltage at the first node being less than the second DC voltage at the second node.

In another embodiment of the first aspect, the control circuitry is further configured to cause the first transistor and the fourth transistor to operate in their respective on-states, and cause the second transistor and the third transistor to operate in their respective off-states, in response to a first AC voltage at the first node being greater than a DC voltage at the third node.

In another embodiment of the first aspect, the control circuitry is further configured to cause the first transistor and the fourth transistor to operate in their respective off-states, and cause the second transistor and the third transistor to operate in their respective on-states, in response to a second AC voltage at the second node being greater than the DC voltage at the third node.

In another embodiment of the first aspect, the A/V recording and communication doorbell device further includes a button configured to be pressed to cause a signaling device to activate, wherein the control circuitry is further configured to cause the transistor assembly to short-circuit the input power bus, in response to the button being pressed, to cause the signaling device to activate.

In another embodiment of the first aspect, the signaling device is at least one of a mechanical signaling device and a digital signaling device.

In another embodiment of the first aspect, the control circuitry is configured to cause the transistor assembly to short-circuit the input power bus by causing the first transistor and the second transistor to operate in their respective on-states.

In another embodiment of the first aspect, the control circuitry is configured to cause the transistor assembly to short-circuit the input power bus by causing the third transistor and the fourth transistor to operate in their respective on-states.

In another embodiment of the first aspect, each of the first transistor and the second transistor includes a p-channel metal oxide semiconductor field effect transistor (MOSFET), and each of the third transistor and the fourth transistor includes an n-channel MOSFET.

In another embodiment of the first aspect, the A/V recording and communication doorbell device further includes a respective diode device electrically coupled in parallel with each of the first transistor, the second transistor, the third transistor, and the fourth transistor.

In a second aspect, a method is performed by an A/V recording and communication doorbell device to transfer electrical power from an input power bus to an output power bus, and the method includes detecting a voltage at a node of the input power bus, and based on the voltage, controlling a transistor assembly to transfer electrical power between the input power bus and the output power bus to power circuitry of the A/V recording and communication doorbell device.

In an embodiment of the second aspect, the voltage is an alternating current (AC) voltage at the node, and controlling a transistor assembly to transfer electrical power between the input power bus and the output power bus includes causing the transistor assembly to emulate a bridge rectifier to convert an AC input power from the input power bus to a direct current (DC) output power into the output power bus.

In another embodiment of the second aspect, the method further includes controlling the transistor assembly to emulate a diode electrically coupled across the input power bus to rectify the AC input power into a rectified DC output power to a signaling device.

In another embodiment of the second aspect, the method further includes receiving an input to cause the signaling device to activate and in response to receiving the input to cause the signaling device to activate, causing the transistor assembly to short-circuit the input power bus to provide the AC input power to the signaling device.

In another embodiment of the second aspect, the voltage is a DC voltage at the node, and controlling a transistor assembly to transfer electrical power between the input power bus and the output power bus includes causing the transistor assembly to provide a DC path between the input power bus to the output power bus, based on the DC voltage.

In another embodiment of the second aspect, the node is a first node of the input power bus, the DC voltage is a first DC voltage, and the DC path is a first DC path, and the method further includes detecting a second DC voltage at a second node of the input power bus and determining whether the first DC voltage is greater than the second DC voltage. When the first DC voltage is greater than the second DC voltage, the transistor assembly provides the first DC path, and when the first DC voltage is not greater than the second DC voltage, the transistor assembly provides a second DC path.

In another embodiment of the second aspect, the first DC path and the second DC path are electrically coupled to the output electrical power bus in a same polarity.

In another embodiment of the second aspect, the voltage is an AC voltage, and the method further includes detecting a DC voltage at a node of the output power bus and determining that the AC voltage at the node of the input power bus is greater than the DC voltage at the node of the output power bus. Upon the determining that the AC voltage at the node of the input power bus is greater than the DC voltage at the node of the output power bus, controlling a transistor assembly to transfer electrical power between the input power bus and the output power bus includes converting an AC input power from the input power bus to a DC output power into the output power bus.

In another embodiment of the second aspect, the AC voltage is a first AC voltage and the node of the input power bus is a first node of the input power bus, and the method further includes detecting a second AC voltage at a second node of the input power bus, where the first AC voltage is an opposite polarity of the second AC voltage, and determining that the second AC voltage at the second node of the input power bus is greater than the DC voltage at the node of the output power bus. Upon the determining that the second AC voltage at the second node of the input power bus is greater than the DC voltage at the node of the output power bus, controlling a transistor assembly to transfer electrical power between the input power bus and the output power bus includes converting the AC input power from the input power bus to the DC output power into the output power bus.

In a third aspect, an A/V recording and communication doorbell device includes a full-wave rectifier circuit which includes a first two series-connected diodes in parallel with a second two series-connected diodes, where the full-wave rectifier circuit is electrically coupled between an input power bus and an output power bus. The full-wave rectifier circuit is configured to convert an alternating current (AC) input power from the input power bus to a direct current (DC) output power into the output power bus to power the A/V recording and communication doorbell device. The A/V recording and communication doorbell device further includes control circuitry and a transistor assembly. The transistor assembly includes four transistors, each of the four transistors being connected in parallel with a respective one of the diodes of the full-wave rectifier circuit. The control circuit is configured to detect a voltage at a node of the input power bus, and based on the voltage, cause the transistor assembly to convert the AC input power from the input power bus to the DC output power into the output power bus in lieu of the full-wave rectifier circuit.

In an embodiment of the third aspect, the control circuitry is further configured to cause the transistor assembly to emulate a diode electrically coupled across the input power bus to rectify the AC input power into a rectified DC output power to a signaling device.

In another embodiment of the third aspect, the A/V recording and communication doorbell device further includes a button configured to be pressed to cause a signaling device to activate, and the control circuitry is further configured to cause the transistor assembly to short-circuit the input power bus, in response to the button being pressed, to cause the signaling device to activate.

In another embodiment of the third aspect, the control circuitry is further configured to detect a presence of DC voltage on the input power bus, and in response to detection of the DC voltage on the input power bus, cause the transistor assembly to provide a DC path between the input power bus and the output power bus.

In another embodiment of the third aspect, the input power bus includes a first node and a second node, the output power bus includes a third node and a fourth node, and the transistor assembly includes a first transistor electrically coupled between the first node and the third node, a second transistor electrically coupled between the second node and the third node, a third transistor electrically coupled between the first node and the fourth node, and a fourth transistor electrically coupled between the second node and the fourth node.

In another embodiment of the third aspect, the control circuitry is further configured to cause the first transistor and the fourth transistor to operate in their respective on-states, and cause the second transistor and the third transistor to operate in their respective off-states, in response to a first DC voltage at the first node being greater than a second DC voltage at the second node.

In another embodiment of the third aspect, the control circuitry is further configured to cause the first transistor and the fourth transistor to operate in their respective off-states, and cause the second transistor and the third transistor to operate in their respective on-states, in response to the first DC voltage at the first node being less than the second DC voltage at the second node.

In another embodiment of the third aspect, the control circuitry is further configured to cause the first transistor and the fourth transistor to operate in their respective on-states, and cause the second transistor and the third transistor to operate in their respective off-states, in response to a first AC voltage at the first node being greater than a DC voltage at the third node.

In another embodiment of the third aspect, the control circuitry is further configured to cause the first transistor and the fourth transistor to operate in their respective off-states, and cause the second transistor and the third transistor to operate in their respective on-states, in response to a second AC voltage at the second node being greater than the DC voltage at the third node.

In another embodiment of the third aspect, the A/V recording and communication doorbell device further includes a button configured to be pressed to cause a signaling device to activate, and the control circuitry is further configured to cause the transistor assembly to short-circuit the input power bus, in response to the button being pressed, to cause the signaling device to activate.

In another embodiment of the third aspect, the signaling device is at least one of a mechanical signaling device and a digital signaling device.

In another embodiment of the third aspect, the control circuitry is configured to cause the transistor assembly to short-circuit the input power bus by causing the first transistor and the second transistor to operate in their respective on-states.

In another embodiment of the third aspect, the control circuitry is configured to cause the transistor assembly to short-circuit the input power bus by causing the third transistor and the fourth transistor to operate in their respective on-states.

In another embodiment of the third aspect, each of the first transistor and the second transistor includes a p-channel metal oxide semiconductor field effect transistor (MOSFET), and each of the third transistor and the fourth transistor includes an n-channel MOSFET.

BRIEF DESCRIPTION OF THE DRAWINGS

The various embodiments of the present A/V recording and communication doorbell devices including a transistor assembly now will be discussed in detail with an emphasis on highlighting the advantageous features. These embodiments depict the novel and non-obvious A/V recording and communication doorbell devices shown in the accompanying drawings, which are for illustrative purposes only. These drawings include the following figures, in which like numerals indicate like parts:

FIG. 7 is a flowchart illustrating an example process for transferring electrical power from an input power bus to an output power bus, according to various aspects of the present disclosure.

DETAILED DESCRIPTION

Figure 1:
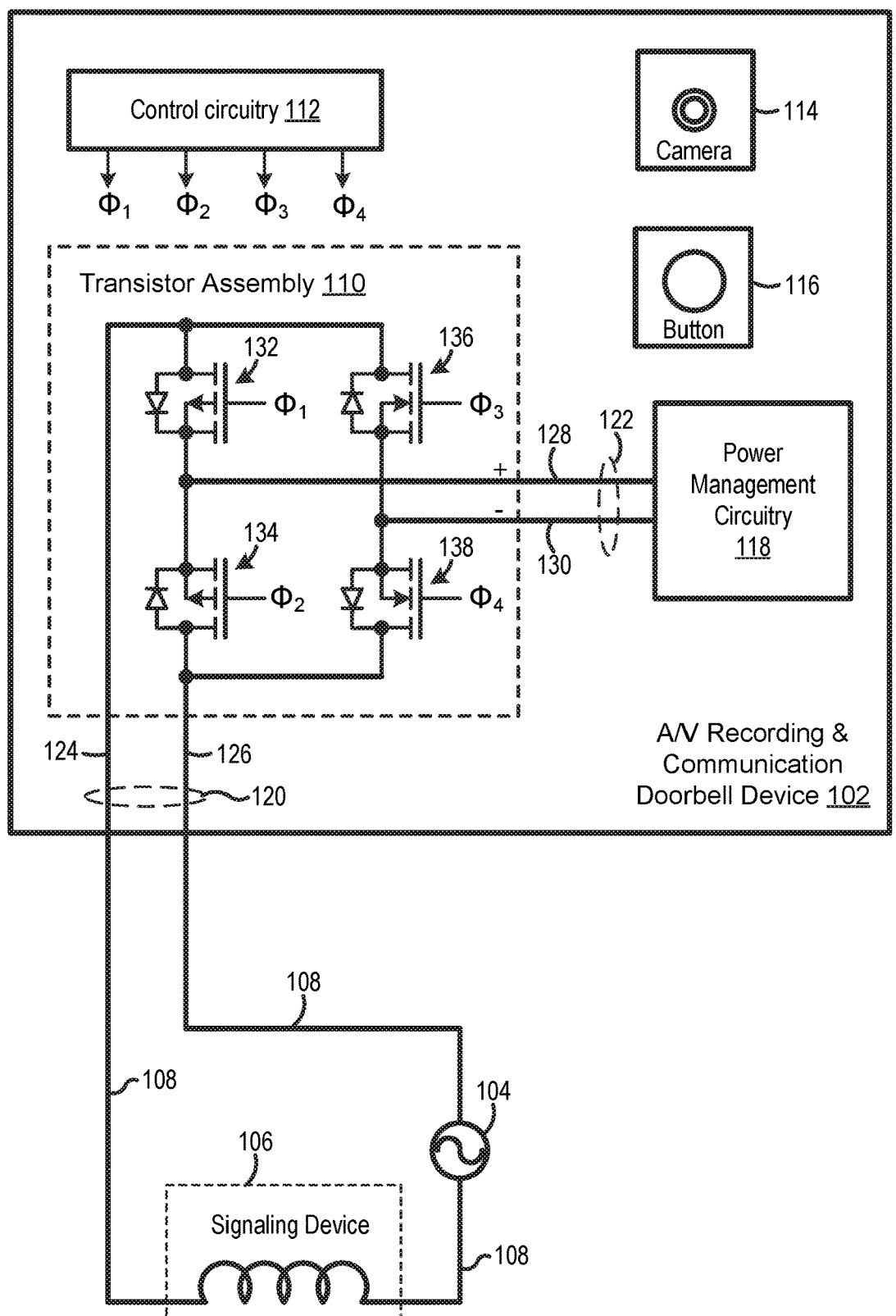
FIG. 1 is a schematic diagram illustrating an example of an A/V recording and communication doorbell device including a transistor assembly that is electrically coupled to an alternating current power source and a signaling device, according to various aspects of the present disclosure.

As discussed above, a full-wave rectifier circuit of an A/V recording and communication doorbell device may dissipate significant power under certain circumstances. Additionally, voltage drop across diodes of a full-wave rectifier circuit may result in insufficient power supply voltage on the output power bus under some conditions. The present embodiments solve these problems, for example, by providing A/V recording and communication doorbell devices including a transistor assembly. The transistor assembly is electrically coupled between an input power bus and an output power bus. The input power bus may be, for example, electrically coupled with an AC or DC power source, and in some embodiments the input power bus is electrically coupled in series with a signaling device and an AC or DC power source. The output power bus provides DC output power for the A/V recording and communication doorbell device.

The input power bus includes a first node and a second node, and the output power bus includes a third node and a fourth node. The transistor assembly includes a first transistor, a second transistor, a third transistor, and a fourth transistor. The first transistor is electrically coupled between the first node and the third node, and the second transistor is electrically coupled between the second node and the third node. The third transistor is electrically coupled between the first node and the fourth node, and the fourth transistor is electrically coupled between the second node and the fourth node. The control circuitry is configured to generate a first control signal $\phi_1$, a second control signal $\phi_2$, a third control signal $\phi_3$, and a fourth control signal $\phi_4$, which control the first transistor, the second transistor, the third transistor, and the fourth transistor, respectively. The control circuitry is configured to generate the first control signal $\phi_1$, the second control signal $\phi_2$, the third control signal $\phi_3$, and the fourth control signal $\phi_4$ to cause the transistor assembly to convert an AC input power and/or a DC input power from the input power bus to DC output power into the output power bus.

The A/V recording and communication doorbell devices further include a button that is configured to be pressed by a user to cause a signaling device to activate. In certain embodiments, the control circuitry is configured to cause the transistor assembly to short-circuit the input power bus, in response to the button being pressed or in response to receiving another input, to cause the signaling device to activate. Additionally, in some embodiments, the control circuitry is configured to detect a presence of AC voltage on the input power bus, and in response to detecting the presence of the AC voltage on the input power bus, cause the transistor assembly to emulate a bridge rectifier to convert the AC input power from the input power bus to the DC output power into the output power bus. Furthermore, in particular embodiments, the control circuitry is configured to detect a presence of DC voltage on the input power bus, and in response to detection of the DC voltage on the input power bus, cause the transistor assembly to provide a DC path between the input power bus and the output power bus. Moreover, in some embodiments, the control circuitry is configured to cause the transistor assembly to emulate a diode electrically coupled across the input power bus to rectify the AC input power into a rectified output power to a signaling device.

The remaining detailed description describes the present embodiments with reference to the drawings. In the drawings, reference numbers label elements of the present embodiments. These reference numbers are reproduced below in connection with the discussion of the corresponding drawing features.

FIG. 1 is a schematic diagram illustrating an A/V recording and communication doorbell device 102 including a transistor assembly that is electrically coupled to an alternating current (AC) power source 104 and a signaling device 106 via wiring 108. The A/V recording and communication doorbell device 102 is configured to activate the signaling device 106, e.g., to cause the signaling device 106 to output sound, when a user presses a button 116 of the A/V recording and communication doorbell device 102, as discussed below. In some embodiments, the A/V recording and communication doorbell device 102 is located at a premises (e.g., a home), with the A/V recording and communication doorbell device 102 being located outside the home (e.g., next to a front door). In some other embodiments, the A/V recording and communication doorbell device 102 may be inside the home.

The AC power source 104 is configured to provide power into the A/V recording and communication doorbell device 102 and the signaling device 106. For example, the AC power source 104 may be a (e.g., step-down) transformer, having a primary winding that is electrically coupled to an external AC power source (e.g., AC mains power supply), and a secondary winding that is electrically coupled in series with the A/V recording and communication doorbell device 102 and the signaling device 106, via the wiring 108. The transformer may step down the voltage from the external AC power source from, for example, from a high voltage (e.g., 120 volts) to a lower voltage, typically 16 to 24 volts. In some embodiments, the AC power source 104 may be the AC mains power supply. In other embodiments, the power source 104 may be a direct current (DC) power source, e.g., as discussed below with respect to FIG. 2, instead of an AC power source.

The signaling device 106 is symbolically depicted herein as a solenoid coil. In particular embodiments, the signaling device 106 is configured to output sound and/or light, when activated. In some embodiments, the signaling device 106 may be, for example, a mechanical signaling device or an electronic signaling device.

The A/V recording and communication doorbell device 102 includes a transistor assembly 110, control circuitry 112, a camera 114, and the button 116. Additionally, the A/V recording and communication doorbell device 102 may include power management circuitry 118. The camera 114 is configured to capture (e.g., generate) image data (e.g., still images, video images, etc.) representing an image of a scene proximate to the A/V recording and communication device 102.

Figure 2:
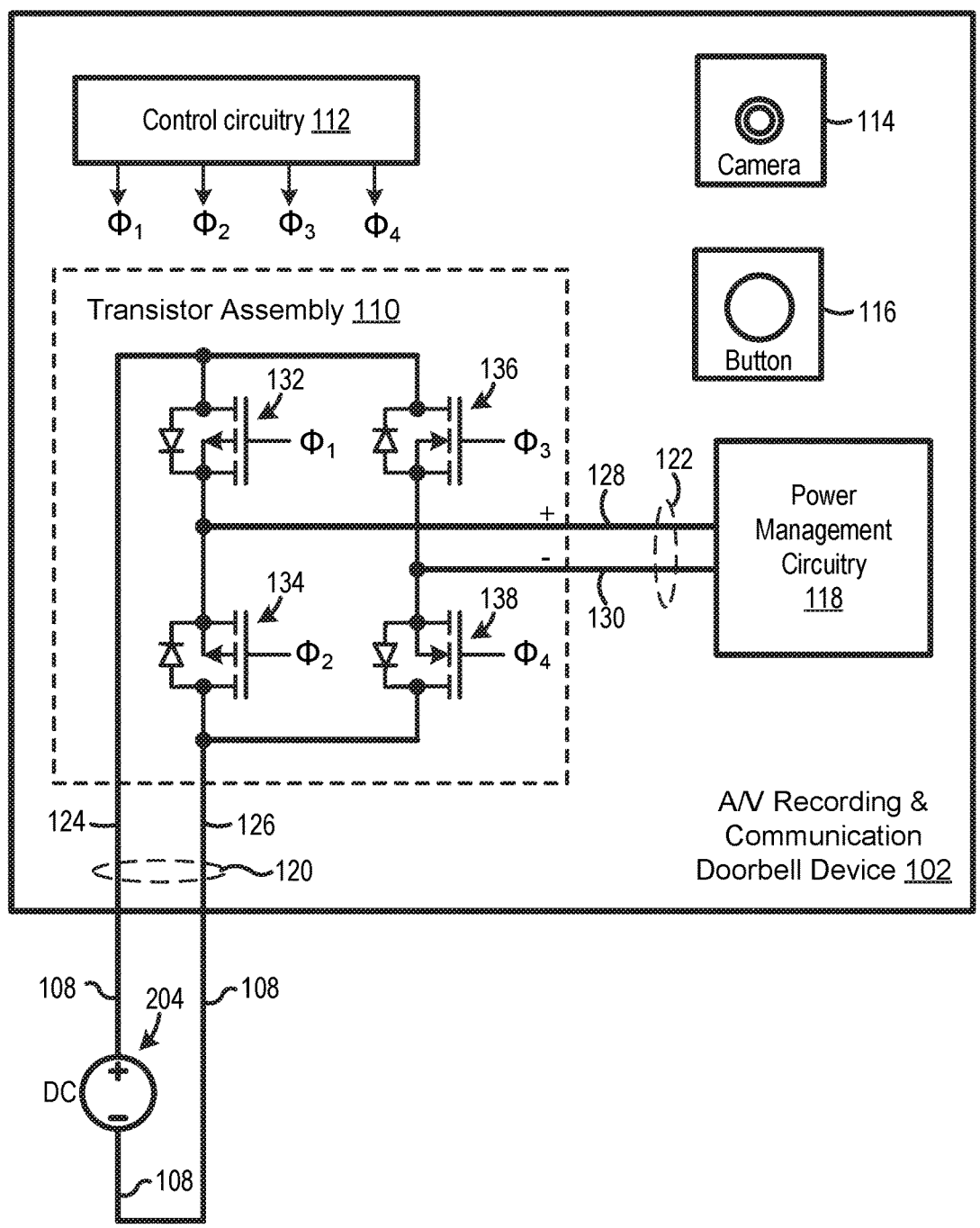
FIG. 2 is a schematic diagram illustrating an example of an A/V recording and communication doorbell device including a transistor assembly that is electrically coupled to a direct current power source, according to various aspects of the present disclosure.

The transistor assembly 110 is electrically coupled between an input power bus 120 and an output power bus 122. In the example of FIG. 1, the input power bus 120 distributes AC input power from the AC power source 104. However, in some other embodiments, the input power bus 120 distributes DC input power, and in yet some other embodiments, the input power bus 120 distributes either AC input power or DC input power, depending on whether an AC electrical power source or a DC power electrical source is electrically coupled to the input power bus 120. For example, FIG. 2 is a schematic diagram illustrating an example where the input power bus 120 distributes DC input power. The example of FIG. 2 is similar to the example of FIG. 1, except that the AC power source 104 is replaced with a DC power source 204, and the signaling device 106 is omitted. The DC power source 204 may be, for example, a photovoltaic device and/or a battery device.

Referring again to FIG. 1, the output power bus 122 provides DC output power for the A/V recording and communication doorbell device 102. In some embodiments, the output power bus 122 is electrically coupled to the power management circuitry 118, as illustrated in FIG. 1. The power management circuitry 118, for example, converts DC output power from the output power bus 122 to a form suitable for use by one or more elements of the A/V recording and communication doorbell device 102, such as to a form suitable for use by one or more of the button 106, the control circuitry 112, and the camera 114. Connections between the power management circuitry 118 and electrical loads within the A/V recording and communication doorbell device 102, e.g., connections between the power management circuitry 118 and the control circuitry 112, are not shown in FIG. 1 to promote illustrative clarity. In certain embodiments, the power management circuitry 118 generates one or more regulated power supply voltages from the DC output power from the output power bus 122. For example, in particular embodiments, the power management circuitry 118 includes one or more DC-to-DC converters. In some other embodiments, the power management circuitry 118 is omitted, and the elements of the A/V recording and communication doorbell device 102 are powered directly from the output power bus 122.

As discussed below, in certain embodiments, the control circuitry 112 is configured to cause the transistor assembly 110 to short-circuit the input power bus 120 in response to a user pressing the button 116, to activate the signaling device 106. Short circuiting the input power bus 120 may interrupt flow of electrical power to the power management circuitry 118. Therefore, certain embodiments of the A/V recording and communication doorbell device 102 further include an energy storage device(s) (not shown), such as a battery or a capacitor, to provide power to the power management circuitry 118 when the transistor assembly 110 short-circuits the input power bus 120. Inclusion of the energy storage device(s) enables the A/V recording and communication doorbell device 102 to remain powered when power flow is interrupted by short-circuiting the input power bus 120.

The input power bus 120 includes a first node 124 and a second node 126, and the output power bus 122 includes a third node 128 and a fourth node 130. The input power bus 120 may be, for example, electrically coupled in series with the AC power source 104 and the signaling device 106. The transistor assembly 110 includes a first transistor 132, a second transistor 134, a third transistor 136, and a fourth transistor 138. The fourth node 130 may be, for example, a reference node or a ground node. The first transistor 132 is electrically coupled between the first node 124 and the third node 128, and the second transistor 134 is electrically coupled between the second node 126 and the third node 128. The third transistor 136 is electrically coupled between the first node 124 and the fourth node 130, and the fourth transistor 138 is electrically coupled between the second node 126 and the fourth node 130.

In the illustrated embodiment of FIG. 1, each of the first transistor 132 and the second transistor 134 is a p-channel, enhancement-mode, metal oxide semiconductor field-effect transistor (MOSFET), while each of the third transistor 136 and the fourth transistor 138 is an n-channel, enhancement-mode MOSFET. Use of p-channel MOSFETs as the first transistor 132 and the second transistor 134 may advantageously promote ease of driving the first and second transistors by eliminating the need to drive the transistors' gates to a voltage higher than that of the third node 128. Additionally, use of n-channel MOSFETs as the third transistor 136 and the fourth transistor 138 may advantageously promote low forward voltage drop because an n-channel MOSFET typically has a lower on-resistance than a p-channel MOSFET of similar size and technology. Consequently, the combination of p-channel and n-channel MOSFETs in transistors assembly 110 helps achieve a balance between transistor driving circuitry simplicity and low on-resistance. However, one or more of the first transistor 132, the second transistor 134, the third transistor 136, and the fourth transistor 138 could be replaced with a different type of transistor, e.g., with a different type of MOSFET or with a bipolar junction transistor (BJT), without departing from the scope hereof.

The control circuitry 112 is configured to generate a first control signal $\phi_1$, a second control signal $\phi_2$, a third control signal $\phi_3$, and a fourth control signal $\phi_4$, which control the first transistor 132, the second transistor 134, the third transistor 136, and the fourth transistor 138, respectively. Connections between the control circuitry 112 and the transistors assembly 110 are not shown in FIG. 1 to promote illustrative clarity. The control circuitry 112 is configured to generate the first control signal $\phi_1$, the second control signal $\phi_2$, the third control signal $\phi_3$, and the fourth control signal $\phi_4$ to cause the transistor assembly 110 to convert at least one of an AC input power and a DC input power from the input power bus 120 to DC output power into the output power bus 122.

For example, in some embodiments, the control circuitry 112 is configured to detect a presence of AC voltage on the input power bus 120, and in response to detecting the presence of the AC voltage on the input power bus 120, cause the transistor assembly 110 to emulate a bridge rectifier to convert the AC input power from the input power bus 120 to the DC output power into the output power bus 122. The control circuitry 112 is configured to cause the transistor assembly 110 to emulate a bridge rectifier, for example, by (a) detecting a DC voltage at the third node 128, (b) determining that the AC voltage at the first node 124 is greater than the DC voltage at the third node 128, and (c) in response to determining that the AC voltage at the first node 124 is greater than the DC voltage at the third node 128, generating the control signals $\phi_1$, $\phi_2$, $\phi_3$, and $\phi_4$ such that the first transistor 132 and the fourth transistor 138 operate in their respective on-states, and the second transistor 134 and third transistor 136 operate in their respective off-states. Consequently, power is transferred between the input power bus 120 and the output power bus 122 via the first transistor 132 and the fourth transistor 138, when the AC voltage at the first node 124 is greater than the DC voltage at the third node 128, in these embodiments.

The control circuitry 112 is further configured to emulate a bridge rectifier, for example, by (a) detecting a DC voltage at the third node 128, (b) determining that the AC voltage at the second node 126 is greater than the DC voltage at the third node 128, and (c) in response to determining that the AC voltage at the second node 126 is greater than the DC voltage at the third node 128, generating the control signals $\phi_1$, $\phi_2$, $\phi_3$, and $\phi_4$ such that the second transistor 134 and the third transistor 136 operate in their respective on-states, and the first transistor 132 and fourth transistor 138 operate in their respective off-states. Consequently, power is transferred between the input power bus 120 and the output power bus 122 via the second transistor 134 and the third transistor 136, when the AC voltage at the second node 126 is greater than the DC voltage at the third node 128, in these embodiments.

In some embodiments, the control circuitry 112 is configured to detect a presence of DC voltage on the input power bus 120, and in response to detection of the DC voltage on the input power bus 120, cause the transistor assembly 110 to provide a DC path between the input power bus 120 and the output power bus 122. The control circuitry 112 is configured to cause the transistor assembly 110 to provide a DC path between the input power bus 120 and the output power bus 122, for example, by (a) detecting a first DC voltage at the first node 124, (b) detecting a second DC voltage at the second node 126, (c) determining whether the first DC voltage is greater than the second DC voltage, (d) when the first DC voltage is greater than the second DC voltage, causing the transistor assembly 110 to provide a first DC path between the input power bus 120 and the output power bus 122, and (e) when the first DC voltage is not greater than the second DC voltage, the transistor assembly 110 provides a second DC path between the input power bus 120 and the output power bus 122. The first and second DC paths are electrically coupled to the output electrical power bus in a same polarity, e.g., the third node 128 is positive and the fourth node 130 is negative, or vice-versa, in both of the first and second DC paths.

The control circuitry 112 is configured to cause the transistor assembly 110 to provide the first DC path between the input power bus 120 and the output power bus 122, for example, by generating the control signals $\phi_1$, $\phi_2$, $\phi_3$, and $\phi_4$ such that the first transistor 132 and the fourth transistor 138 operate in their respective on-states, and the second transistor 134 and the third transistor 136 operate in their respective off-states. Consequently, current flows between the input power bus 120 and the output power bus 122 via the first transistor 132 and the fourth transistor 138, in the first DC path. The control circuitry 112 is configured to cause the transistor assembly 110 to provide the second DC path between the input power bus 120 to the output power bus 122, for example, by generating the control signals $\phi_1$, $\phi_2$, $\phi_3$, and $\phi_4$ such that the first transistor 132 and the fourth transistor 138 operate in their respective off-states, and such that the second transistor 134 and the third transistor 136 operate in their respective on-states. Consequently, current flows between the input power bus 120 and the output power bus 122 via the second transistor 134 and the third transistor 136, in the second DC path.

Certain embodiments of the signaling device 106 may require a constant DC power supply for proper operation. Accordingly, in some embodiments, the control circuitry 112 is further configured to cause the transistor assembly 110 to emulate a diode electrically coupled across the input power bus 120 to rectify the AC input power into a rectified DC output power to the signaling device 106. The control circuitry 112 is configured to cause the transistor assembly 110 to emulate a diode electrically coupled across the input power bus 120, for example, by either (1) generating the control signals $\phi_1$, $\phi_2$, $\phi_3$, and $\phi_4$ such that the first transistor 132 and the second transistor 134 emulate a diode, or (2) generating the control signals $\phi_1$, $\phi_2$, $\phi_3$, and $\phi_4$ such that the third transistor 136 and the fourth transistor 138 emulate a diode. In some embodiments, the control circuitry 112 is configured to generate the control signals $\phi_1$, $\phi_2$, $\phi_3$, and $\phi_4$ such that the first transistor 132 and the second transistor 134 emulate a diode by (1) causing the first transistor 132 and the second transistor 134 to operate in their on-states when voltage magnitude at the first node 124 is greater than voltage magnitude at the second node 126, and (2) causing the first transistor 132 and the second transistor 134 to operate in their off-states when voltage magnitude at the first node 124 is less than or equal to voltage magnitude at the second node 126. In some embodiments, the control circuitry 112 is configured to generate the control signals $\phi_1$, $\phi_2$, $\phi_3$, and $\phi_4$ such that the third transistor 136 and the fourth transistor 138 emulate a diode by (1) causing the third transistor 136 and the fourth transistor 138 to operate in their on-states when voltage magnitude at the second node 126 is greater than voltage magnitude at the first node 124, and (2) causing the third transistor 136 and the fourth transistor 138 to operate in their off-states when voltage magnitude at the second node 126 is less than or equal to voltage magnitude at the first node 124.

The button 116 is configured to be pressed by a user to cause a signaling device, e.g., the signaling device 106 and/or a wireless signaling device (not shown) in wireless communication with the A/V recording and communication doorbell device 102, to activate. In certain embodiments, the control circuitry 112 is configured to cause the transistor assembly 110 to short-circuit the input power bus 120, in response to the button 116 being pressed or in response to receiving another input, to cause the signaling device 106 to activate. Short-circuiting the input power bus 122 results in power from the input power bus 120, e.g., from the AC power source 104 or the DC power source 204, being diverted through the signaling device 106, thereby activating the signaling device 106. The signaling device 106, e.g., generates sound, such as a "ding-dong" sound or a melody, in response to being activated by the A/V recording and communication doorbell device 102. In particular embodiments, the control circuitry 112 causes the transistor assembly 110 to short-circuit the input power bus 120 by either (a) generating first and second control signals $\phi_1$ and $\phi_2$ such that the first transistor 132 and the second transistor 134 simultaneously operate in their respective on-states, or (b) generating third and fourth control signals $\phi_3$ and $\phi_4$ such that the third transistor 136 and the fourth transistor 138 simultaneously operate in their respective on-states.

In certain embodiments, the control circuitry 112 is configured to perform additional functions, e.g., the control circuitry 112 may control the camera 114. The control circuit 112 may be implemented, for example, by digital electronic circuitry and/or analog electronic circuitry. The A/V recording and communication doorbell device 102 can include additional elements without departing from the scope hereof.

Figure 3:
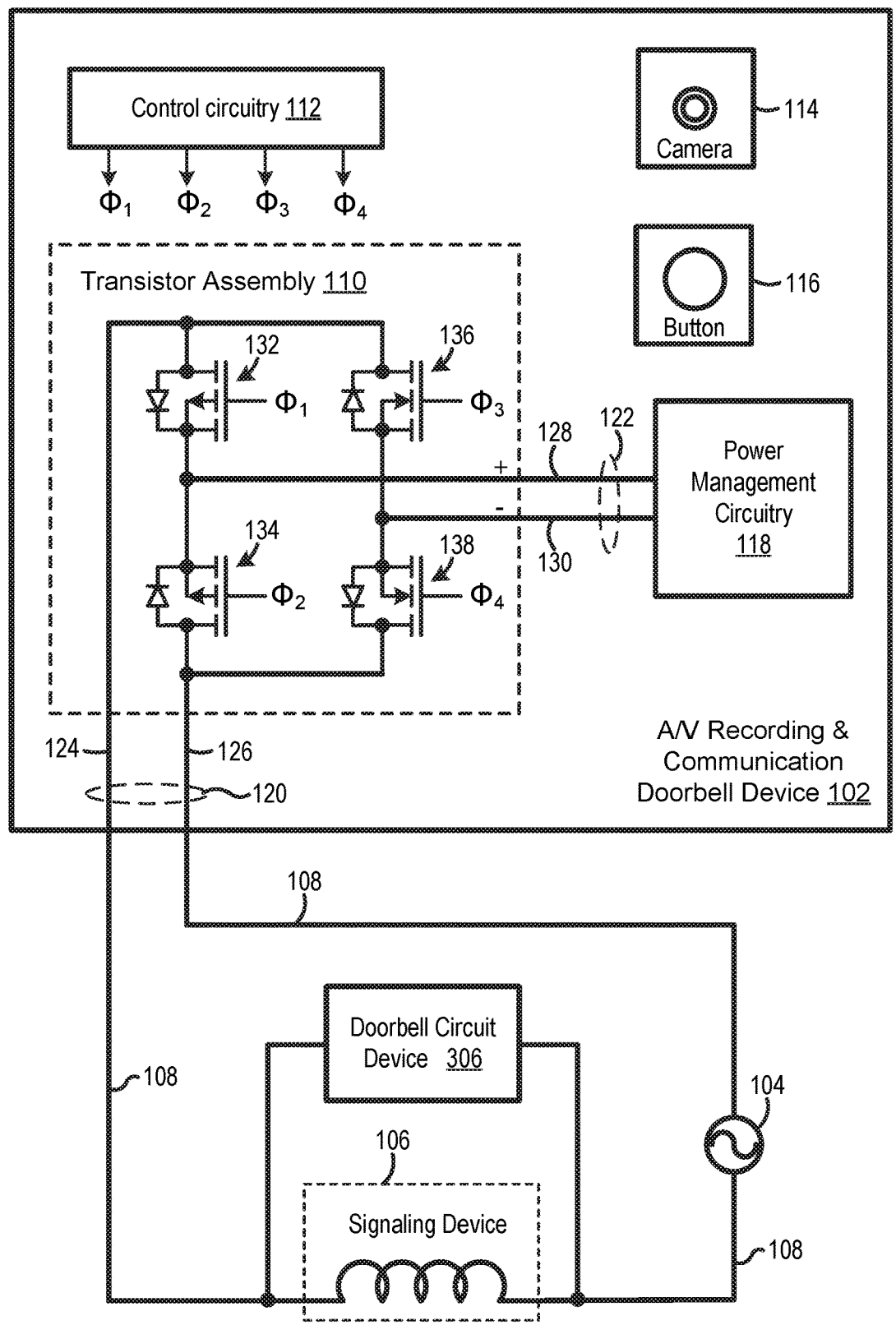
FIG. 3 is a schematic diagram illustrating an example of an A/V recording and communication doorbell device including a transistor assembly that is electrically coupled to an alternating current power source, a signaling device, and a doorbell circuit device, according to various aspects of the present disclosure.

The A/V recording and communication device 102 may be electrically coupled to external circuitry in a different manner than that illustrated in FIGS. 1 and 2 without departing from the scope hereof. For example, FIG. 3 illustrates an alternate embodiment where a doorbell circuit device 306 is electrically coupled in parallel with the signaling device 106. The doorbell circuit device 306 diverts power around the signaling device 106 when the transistor assembly 110 is not short-circuiting the input power bus 120, e.g., when the button 116 is not being pressed. For instance, the doorbell circuit device 306 may create a path of low impedance, allowing current drawn by the A/V recording and communication device 102 to flow through the doorbell circuit device 306, rather than flow through the signaling device 106. In response to a user pressing the button 116 and the transistor assembly 110 short-circuiting the input power bus 120, the doorbell circuit device 306 may sense an increase in voltage across the doorbell circuit device 306 (since there is a reduced voltage across the input power bus 120), and in response impress power onto the signaling device 106 by creating a path of high impedance, thereby diverting current into the signaling device 106 in order to activate it.

Figure 4:
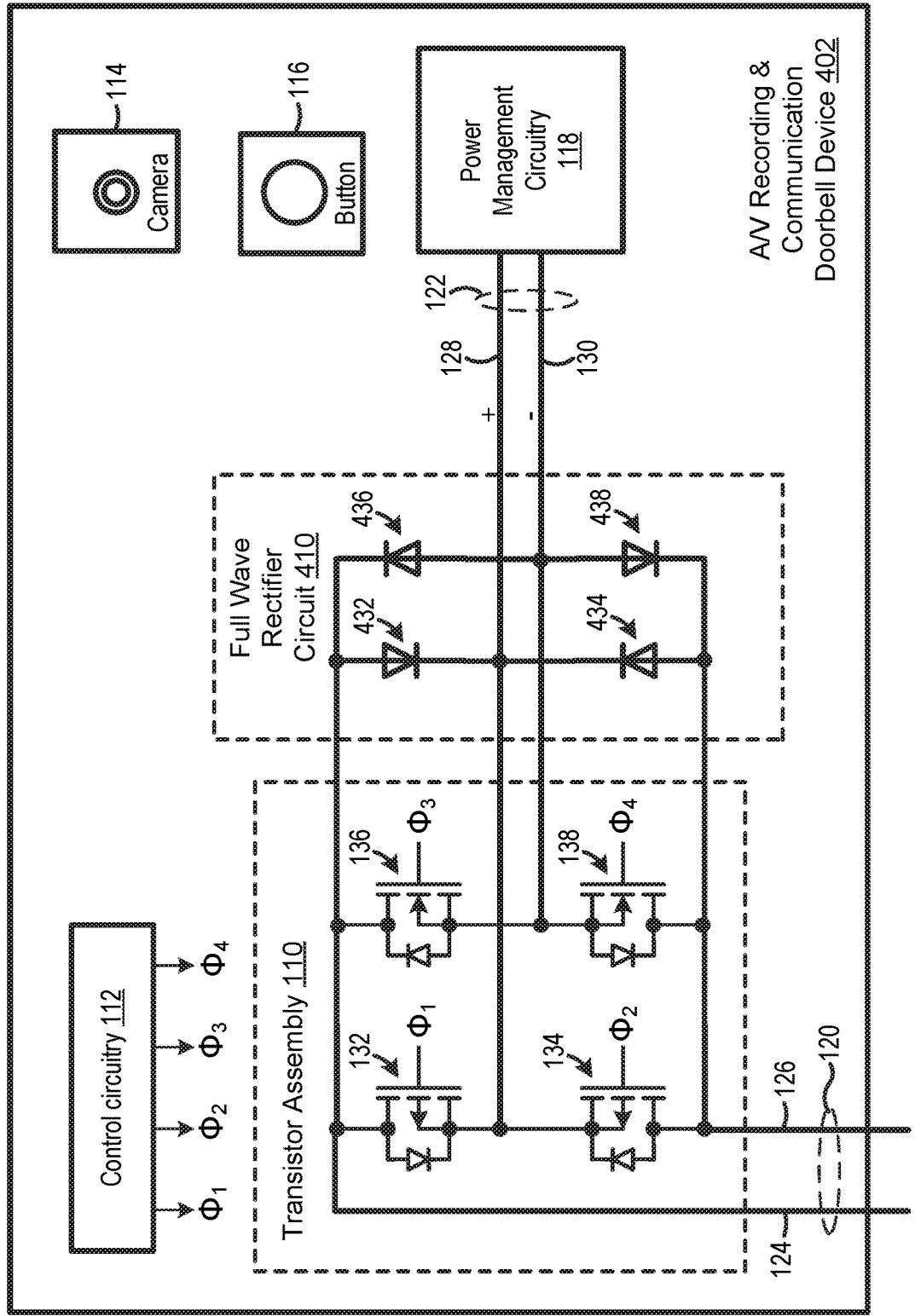
FIG. 4 is a schematic diagram illustrating an example of an A/V recording and communication doorbell device including a transistor assembly and a full-wave rectifier circuit, according to various aspects of the present disclosure.

In some embodiments, transistor assembly 110 could be configured to work in conjunction with a full-wave rectifier circuit. For example, FIG. 4 is a schematic diagram illustrating an A/V recording and communication doorbell device 402 that is similar to the A/V recording and communication doorbell device 102, but further including a full-wave rectifier circuit 410. The full-wave rectifier circuit 410 is electrically coupled between the input power bus 120 and the output power bus 122, and the full-wave rectifier circuit 410 is configured to convert AC input power from the input power bus 120 to a DC output power into the output power bus 122 to power the A/V recording and communication doorbell device 402. The full-wave rectifier circuit 410 includes a first two series-connected diodes 432 and 434 in parallel with a second two series-connected diodes 436 and 438. The diode 432 is electrically coupled in parallel with the first transistor 132, and the diode 434 is electrically coupled in parallel with the second transistor 134. The diode 436 is electrically coupled in parallel with the third transistor 136, and the diode 438 is electrically coupled in parallel with the fourth transistor 138.

In some embodiments of the A/V recording and communication doorbell device 402, the control circuitry 112 is configured to operate the transistor assembly 110 in a manner similar to that discussed above with respect to the A/V recording and communication doorbell device 102. In some other embodiments of the A/V recording and communication doorbell device 402, the control circuitry 112 is configured to cause the transistors 132, 134, 136, and 138 of the transistor assembly 110 to operate in their on-states only under certain operating conditions of the A/V recording and communication doorbell device 402.

For example, in a particular embodiment, the control circuitry 112 is configured to cause the transistor assembly 110 to operate only when the input power bus 120 distributes DC input power. In this embodiment, the control circuitry 112 is configured to cause the transistor assembly 110 to provide a first or a second DC path between the input power bus 120 and the output power bus 122 in response to detecting presence of DC voltage on the input power bus 120, in a manner similar to that discussed above with respect to the A/V recording and communication doorbell device 102. However, in this embodiment, the control circuitry 112 is configured to disable operation of the transistor assembly 110 when an AC voltage is detected on the input power bus 120, and the full-wave rectifier circuit 410 transfers AC power from the input power bus 120 to the output power bus 122 in this embodiment.

As another example, in an embodiment, the control circuitry 112 is configured to cause the transistor assembly 110 to provide an AC power path between the input power bus 120 and the output power bus 122 in response to detecting presence of an AC voltage on the input power bus 120, in a manner similar to that discussed above with respect to the A/V recording and communication doorbell device 102. However, in this embodiment, the control circuitry 112 is configured to disable operation of the transistor assembly 110 when a DC voltage is detected on the input power bus 120, and the full-wave rectifier circuit 410 transfers DC power from the input power bus 120 to the output power bus 122 in this embodiment. The control circuitry 112 is configured to disable operation of the transistor assembly 110, for example, by causing each of the transistors 132, 134, 136, and 138 to operate in their respective off-states.

Figure 5:
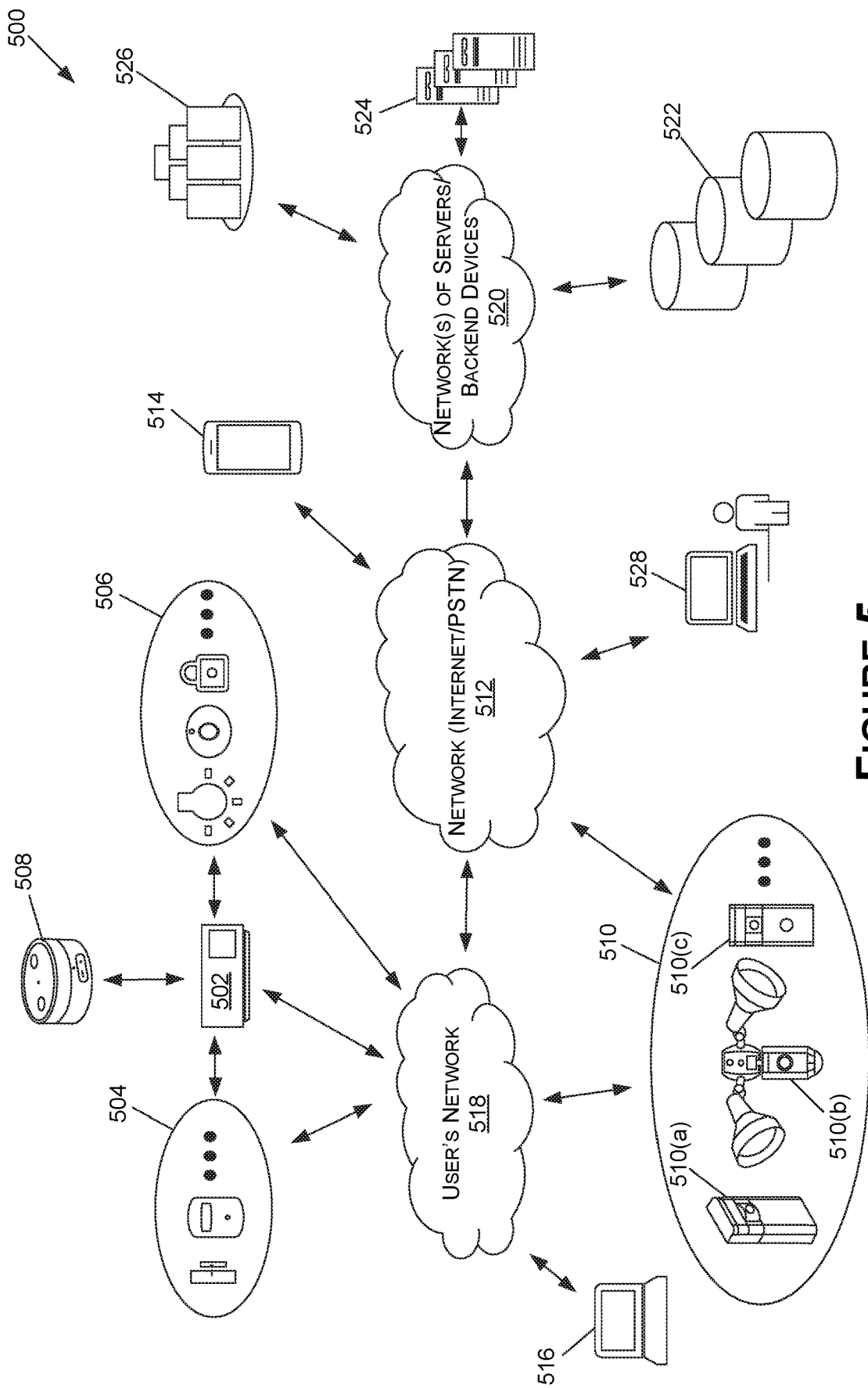
FIG. 5 is a functional block diagram illustrating a system for communicating in a network according to various aspects of the present disclosure.

FIG. 5 is a functional block diagram illustrating a system 500 for communicating in a network according to various aspects of the present disclosure. Home automation, or smart home, is building automation for the home. Home automation enable users (e.g., home owners and authorized individuals) to control and/or automate various devices and/or systems, such as lighting, heating (e.g., smart thermostats), ventilation, home entertainment, air conditioning (HVAC), blinds/shades, security devices (e.g., contact sensors, smoke/

CO detectors, motion sensors, etc.), washers/dryers, ovens, refrigerators/freezers, and/or other network connected devices suitable for use in the home. In various embodiments, Wi-Fi is used for remote monitoring and control of such devices and/or systems. Smart home devices (e.g., hub devices 502, sensors 504, automation devices 506, a virtual assistant (VA) device 508, Audio/Video (A/V) recording and communication devices 510, etc.), when remotely monitored and controlled via a network (Internet/a public switched telephone network (PSTN)) 512, may be considered to be components of the "Internet of Things." Smart home systems may include switches and/or sensors (e.g., the sensors 504) connected to a central hub such as the smart-home hub device 502 and/or the VA device 508 (the hub device 502 and/or the VA device 508 may alternatively be referred to as a gateway, a controller, a home-automation hub, or an intelligent personal assistance device) from which the system may be controlled through various user interfaces, such as voice commands and/or a touchscreen. Various examples, of user interfaces may include any or all of a wall-mounted terminal (e.g., a keypad, a touchscreen, etc.), software installed on the client devices 514, 516 (e.g., a mobile application), a tablet computer, or a web interface. Furthermore, these user interfaces are often but not always supported by Internet cloud services. In one example, the Internet cloud services are responsible for obtaining user input via the user interfaces (e.g., a user interface of the hub device 502 and/or the VA device 508) and causing the smart home devices (e.g., the sensors 504, the automation devices 506, etc.) to perform an operation in response to the user input.

The hub device 502, the VA device 508, the sensors 504, the automation devices 506, the A/V recording and communication devices 510, and/or client devices 514, 516 may use one or more wired and/or wireless communication protocols to communicate, including, for example and without limitation, Wi-Fi (e.g., the user's network 518), X10, Ethernet, RS-485, 6LoWPAN, Bluetooth LE (BLE), ZigBee, Z-Wave, and/or a low power wide-area networks (LPWAN), such as a chirp spread spectrum (CSS) modulation technology network (e.g., LoRaWAN), an Ultra Narrow Band modulation technology network (e.g., Sigfox, Telensa, NB-IoT, etc.), RingNet, and/or the like.

The user's network 518 may be, for example, a wired and/or wireless network. If the user's network 518 is wireless, or includes a wireless component, the user's network 518 may be a Wi-Fi network compatible with the IEEE 802.11 standard and/or other wireless communication standard(s). Furthermore, the user's network 518 may be connected to other networks such as the network 512, which may comprise, for example, the Internet and/or PSTN.

The system 500 may include one or more A/V recording and communication devices 510 (alternatively be referred to herein as "A/V devices 510" or "A/V device 510"). The A/V devices 510 may include security cameras 510(a), light cameras 510(b) (e.g., floodlight cameras, spotlight cameras, etc.), video doorbells 510(c) (e.g., wall powered and/or battery powered video doorbells), and/or other devices capable of recording audio data and/or image data. Video doorbells 510(c) may represent, and/or be similar to, the A/V recording and communication doorbell devices 102 and 402 of FIGS. 1-4. The A/V devices 510 may be configured to access a user's network 518 to connect to a network (Internet/PSTN) 512 and/or may be configured to access a cellular network to connect to the network (Internet/PSTN) 512.

The system 500 may further include a smart-home hub device 502 (which may alternatively be referred to herein as the "hub device 502") connected to the user's network 518 and/or the network (Internet/PSTN) 512. The smart-home hub device 502 (also known as a home automation hub, gateway device, or network device), may comprise any device that facilitates communication with and control of the sensors 504, automation devices 506, the VA device 508, and/or the one or more A/V devices 510. For example, the smart-home hub device 502 may be a component of a security system and/or a home automation system installed at a location (e.g., a property, a premise, a home, a business, etc.). In some embodiments, the A/V devices 510, the VA device 508, the sensors 504, and/or the automation devices 506 communicate with the smart-home hub device 502 directly and/or indirectly using one or more wireless and/or wired communication protocols (e.g., BLE, Zigbee, Z-Wave, etc.), the user's network 518 (e.g., Wi-Fi, Ethernet, etc.), and/or the network (Internet/PSTN) 512. In some of the present embodiments, the A/V devices 510, the VA device 508, the sensors 504, and/or the automation devices 506 may, in addition to or in lieu of communicating with the smart-home hub device 502, communicate with the client devices 514, 516, the VA device 508, and/or one or more of components of the network of servers/backend devices 520 directly and/or indirectly via the user's network 518 and/or the network (Internet/PSTN) 512.

As illustrated in FIG. 5, the system 500 includes the VA device 508. The VA device 508 may be connected to the user's network 518 and/or the network (Internet/PSTN) 512. The VA device 508 may include an intelligent personal assistant, such as, without limitation, Amazon Alexa® and/or Apple Siri®. For example, the VA device 508 may be configured to receive voice commands, process the voice commands to determine one or more actions and/or responses (e.g., transmit the voice commands to the one or more components of the network of servers/backend devices 520 for processing), and perform the one or more actions and/or responses, such as to activate and/or change the status of one or more of the sensors 504, automation devices 506, or A/V devices 510. In some embodiments, the VA device 508 is configured to process user inputs (e.g., voice commands) without transmitting information to the network of servers/backend devices 520 for processing. The VA device 508 may include at least one speaker (e.g., for playing music, for outputting the audio data generated by the A/V devices 510, for outputting the voice of a digital assistant, etc.), at least one a microphone (e.g., for receiving commands, for recording audio data, etc.), and a display (e.g., for displaying a user interface, for displaying the image data generated by the A/V devices 510, etc.). In various embodiments, the VA device 508 may include an array of speakers that are able to produce beams of sound. Although illustrated as a separate component in FIG. 5, in some embodiments the VA device 508 may not be a separate component from the hub device 502. In such embodiments, the hub device 502 may include at least some of the functionality of the VA device 508 or the VA device 508 may include at least some of the functionality of the hub device 502.

The one or more sensors 504 may include, for example, at least one of a door sensor, a window sensor, a contact sensor, a tilt sensor, a temperature sensor, a carbon monoxide sensor, a smoke detector, a light sensor, a glass break sensor, a freeze sensor, a flood sensor, a moisture sensor, a motion sensor, and/or other sensors that may provide the user/owner of the security system a notification of a security event at his or her property.

In various embodiments, a contact sensor may include any component configured to inform (e.g., via a signal) the security system whether an object (e.g., a door or a window) is open or closed. A contact sensor may include first and second components: a first component installed on the object itself (e.g., the door or the window); the second component installed next to the object (e.g., on the door jamb). The first and second components of the contact sensor, however, need not actually be in physical contact with one another in order to be in the closed (not faulted) state. For example, at least one of the first and second components may include a magnet, and the contact sensor may rely on the Hall effect for determining a proximity of the first and second pieces to one another. When the door, window, or other object, is opened, and the first and second components move apart from one another, the contact sensor may transmit an open signal to the security system (e.g., to the hub device 502). A similar process may be performed when the object is closed. In some examples, a signal transmitted by the security system by the contact sensor during opening and/or closing may be the same signal, and the hub device 502 may interpret the signal based on the known state of the object (e.g., when a door is closed, and the signal is received, the hub device 502 may update the status of the door to open).

The one or more automation devices 506 may include, for example, at least one of an outdoor lighting system, an indoor lighting system, and indoor/outdoor lighting system, a temperature control system (e.g., a thermostat), a shade/blind control system, a locking control system (e.g., door lock, window lock, etc.), a home entertainment automation system (e.g., TV control, sound system control, etc.), an irrigation control system, a wireless signal range extender (e.g., a Wi-Fi range extender, a Z-Wave range extender, etc.) a doorbell chime, a barrier control device (e.g., an automated door hinge), a smart doormat, and/or other automation devices.

As described herein, in some of the present embodiments, some or all of the client devices 514, 516, the A/V device(s) 510, the smart-home hub device 502, the VA device 508, the sensors 504, and the automation devices 506 may be referred to as a security system and/or a home-automation system. The security system and/or home-automation system may be installed at location, such as a property, home, business, or premises for the purpose of securing and/or automating all or a portion of the location.

The system 500 may further include one or more client devices 514, 516. The client devices 514, 516 may communicate with and/or be associated with (e.g., capable of access to and control of) the A/V devices 510, a smart-home hub device 502, the VA device 508, sensors 504, and/or automation devices 506. In various embodiments, the client devices 514, 516 communicate with other devices using one or more wireless and/or wired communication protocols, the user's network, and/or the network (Internet/PSTN) 512, as described herein. The client devices 514, 516 may comprise, for example, a mobile device such as a smartphone or a personal digital assistant (PDA), or a computing device such as a tablet computer, a laptop computer, a desktop computer, etc. In some embodiments, the client devices 514, 516 include a connected device, such as a smart watch, Bluetooth headphones, another wearable device, or the like. In such embodiments, the client devices 514, 516 may include a combination of the smartphone or other device and a connected device (e.g., a wearable device), such that alerts, data, and/or information received by the smartphone or other device are provided to the connected device, and one or more controls of the smartphone or other device may be inputted using the connected device (e.g., by touch, voice, etc.).

The A/V devices 510, the hub device 502, the VA device 508, the automation devices 506, the sensors 504, and/or the client devices 514, 516 may also communicate, via the user's network 518 and/or the network (Internet/PSTN) 512, with network(s) of servers and/or backend devices 520, such as (but not limited to) one or more remote storage devices 522 (may be referred to interchangeably as "cloud storage device(s)"), one or more backend servers 524, and one or more backend application programming interfaces (APIs) 526. While FIG. 5 illustrates the storage device 522, the backend server 524, and the backend API 526 as components separate from the network 520, it is to be understood that the storage device 522, the backend server 524, and/or the backend API 526 may be considered to be components of the network 520. For example, the network 520 may include a data center with a plurality of computing resources used to implement the storage device 522, the backend server 524, and the backend API 526.

The backend server 524 may comprise a computer program or other computer executable code that, when executed by processor(s) of the backend server 524, causes the backend server 524 to wait for requests from other computer systems or software (clients) and provide responses. In an embodiment, the backend server 524 shares data and/or hardware and/or software resources among the client devices 514, 516. This architecture is called the client-server model. The client devices 514, 516 may run on the same computer or may connect to the backend server 524 over the network (Internet/PSTN) 512 and/or the network 520. Examples of computing servers include database servers, file servers, mail servers, print servers, web servers, game servers, and application servers. The term server may be construed broadly to include any computerized process that shares a resource to one or more client processes.

The backend API 526 may comprise, for example, a server (e.g. a real server, or a virtual machine, or a machine running in a cloud infrastructure as a service), or multiple servers networked together, exposing at least one API to clients. In various embodiments, the backend API 526 is provided by servers including various components such as an application server (e.g. software servers), a caching layer, a database layer, or other components suitable for implementing one or more APIs. The backend API 526 may, for example, comprise a plurality of applications, each of which communicate with one another using one or more public APIs. In some embodiments, the backend API 526 maintains user data and provides user management capabilities, thereby reducing the load (e.g., memory and processor consumption) of the client devices 514, 516.

In various embodiments, an API is a set of routines, protocols, and tools for building software and applications. Furthermore, the API may describe a software component in terms of its operations, inputs, outputs, and underlying types, defining functionalities that are independent of their respective implementations, which allows definitions and implementations to vary without compromising the interface. As such, the API may provide a programmer with access to a particular application's functionality without the need to modify the particular application.

The backend API 526 illustrated in FIG. 5 may further include one or more services (also referred to as network services). A network service is an application that provides data storage, manipulation, presentation, communication, and/or other capability. Network services are often implemented using a client-server architecture based on application-layer network protocols. Each service may be provided by a server component (e.g., the backend server 524) running on one or more computers (such as a dedicated server computer offering multiple services) and accessed via a network by client components running on other devices (e.g., client devices 514, 516). However, the client and server components can both be run on the same machine. Clients and servers may have a user interface, and sometimes other hardware associated with them.

The network 520 may be any wireless network, any wired network, or a combination thereof, configured to operatively couple the above-mentioned modules, devices, components, and/or systems as illustrated in FIG. 5. For example, the network 520, the user's network 518, and/or the network (Internet PSTN) 512 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, global navigation satellite system (GNSS), such as global positioning systems (GPS), CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-4024 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

The hub device 502, the VA device 508, and/or any of the components of the network(s) of servers/backend devices 520 (e.g., the backend server 524, the backend API 526, the storage devices 522, etc.) may be referred to herein as a "network device" or "network devices."

With further reference to FIG. 5, the system 500 may also include a security monitoring service 528. The security monitoring service 528 may be operated by the same company that manufactures, sells, and/or distributes the A/V devices 510, the hub device 502, the VA device 508, the sensors 504, and/or the automation devices 506. In other embodiments, the security monitoring service 528 may be operated by a third-party company (e.g., a different company than the one that manufactured, sold, and/or distributed the A/V devices 510, the hub device 502, the VA device 508, the sensors 504, and/or the automation devices 506). In any of the present embodiments, the security monitoring service 528 may have control of at least some of the features and components of the security system and/or the home-automation system (e.g., the security monitoring service 528 may be able to arm and/or disarm the security system, lock and/or unlock doors, activate and/or deactivate one or more of the sensors 504 and/or the automation devices 506, etc.). For example, the security monitoring service 528 may operate and control their own client devices and/or network of servers/backend devices for monitoring and/or controlling security systems. In such an example, the A/V devices 510, the hub device 502, the VA device 508, the sensors 504, and/or the automation devices 506 may communicate with the client devices and/or one or more components of the network of servers/backend devices of the security monitoring service 528 over the network (Internet/PSTN) 512 (in some embodiments, via one or more of the components of the network of backend servers/backend devices 520).

Figure 6:
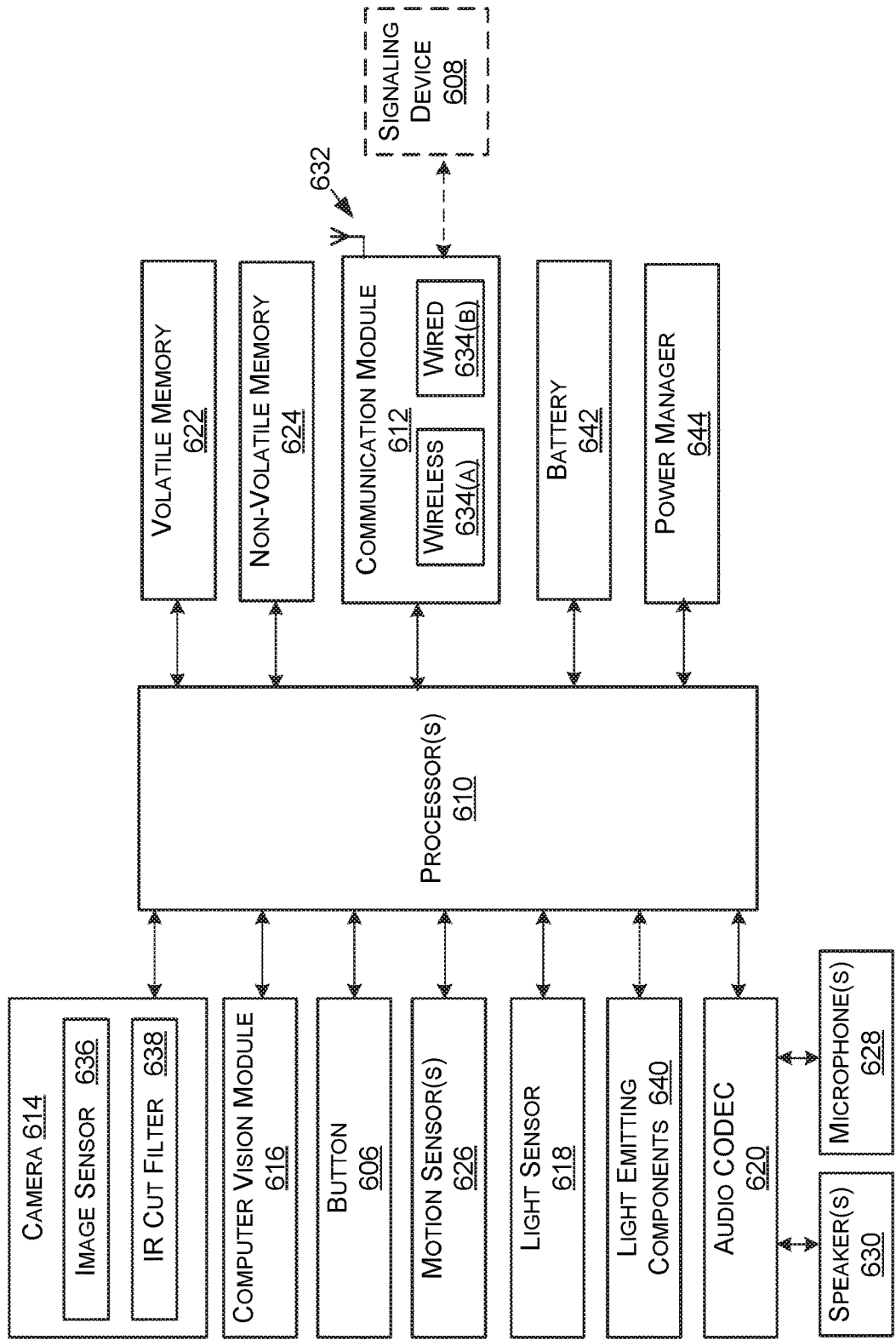
FIG. 6 is a functional block diagram for an A/V recording and communication doorbell device according to various aspects of the present disclosure.

FIG. 6 is a functional block diagram for an A/V recording and communication doorbell device 102 according to various aspects of the present disclosure. The description of FIG. 6 is made with reference to FIGS. 1-4 above. The A/V recording and communication doorbell device 102 may include one or more processor(s) 610, a communication module 612, a power manager 644, a camera 614, a computer vision module 616, a light sensor 618, an audio CODEC (coder-decoder) 620, volatile memory 622, and non-volatile memory 624. The processor(s) 610 (alternatively referred to herein as a "CPU," a "controller," and/or a "microcontroller") may comprise an integrated circuit including a processor core, memory, and programmable input/output peripherals. The processor(s) 610 may receive input signals, such as data and/or power, from the camera 614, motion sensor(s) 626, light sensor 618, microphone(s) 628, speaker(s) 630, and/or the communication module 612, and may perform various functions as described in the present disclosure. In various embodiments, when the processor(s) 610 is triggered by the motion sensor(s) 626, the camera 614, the speaker(s) 630, the microphone(s) 628, the communication module 612, and/or another component, the processor(s) 610 performs one or more processes and/or functions. For example, when the light sensor 618 detects a low level of ambient light, the light sensor 618 may trigger the processor(s) 610 to enable a night vision camera mode. The processor(s) 610 may also provide data communication between various components such as between the communication module 612 and the camera 614.

With further reference to FIG. 6, the communication module 612 may comprise an integrated circuit including a processor core, memory, and programmable input/output peripherals. The communication module 612 may be operatively connected to the processor(s) 610. In some embodiments, the communication module 612 is configured to handle communication links between the A/V device 102 and other, external devices, external receivers, external transmitters, and/or external transceivers, including the client devices 514, 516, and to route incoming/outgoing data appropriately. For example, inbound data from an antenna 632 of the communication module 612 may be routed through the communication module 612 before being directed to the processor(s) 610, and outbound data from the processor(s) 610 may be routed through the communication module 612 before being directed to the antenna 632 of the communication module 612. As another example, the communication module 612 may be configured to transmit data to and/or receive data from a remote network device (e.g., one or more components of the network(s) of servers/backend devices 520 described in FIG. 5). The communication module 612 may include wireless 634(a) and wired 634(*b*) adapters. For example, the communication module 612 may include one or more wireless antennas, radios, receivers, transmitters, and/or transceivers (not shown in FIG. 6 for simplicity) configured to enable communication across one or more wireless networks, such as, without limitation, Wi-Fi, cellular, Bluetooth, Z-Wave, Zigbee, LPWAN(s), and/or satellite networks. The communication module 612 may receive inputs, such as power and/or data, from the camera 614, the processor(s) 610, the button 606, the motion sensors 626, a reset button (not shown in FIG. 6 for simplicity), and/or the non-volatile memory 624. The communication module 612 may also include the capability of communicating over wired connections, such as with a signaling device 608. For example, when the button 606 is pressed, the communication module 612 may be triggered to perform one or more functions, such as to transmit a signal over the wired 634(*b*) connection to the signaling device 608 (although, in some embodiments, the signal be transmitted over a wireless 634(*a*) connection to the signaling device) to cause the signaling device 608 to emit a sound (e.g., a doorbell tone, a user customized sound, a ringtone, a seasonal ringtone, etc.). The communication module 612 may also act as a conduit for data communicated between various components and the processor(s) 610.

With further reference to FIG. 6, the A/V device 102 may include the non-volatile memory 624 and the volatile memory 622. The non-volatile memory 624 may comprise flash memory configured to store and/or transmit data. For example, in certain embodiments the non-volatile memory 624 may comprise serial peripheral interface (SPI) flash memory. In some embodiments, the non-volatile memory 624 may comprise, for example, NAND or NOR flash memory. The volatile memory 622 may comprise, for example, DDR3 SDRAM (double data rate type three synchronous dynamic random-access memory). In the embodiment illustrated in FIG. 6, the volatile memory 622 and the non-volatile memory 624 are illustrated as being separate from the processor(s) 310. However, the illustration of FIG. 6 is not intended to be limiting, and in some embodiments the volatile memory 622 and/or the non-volatile memory 624 may be physically incorporated with the processor(s) 610, such as on the same chip. The volatile memory 622 and/or the non-volatile memory 624, regardless of their physical location, may be shared by one or more other components (in addition to the processor(s) 610) of the present A/V device 102.

With further reference to FIG. 6, the A/V device 102 may include the camera 614. The camera 614 may include an image sensor 636. The image sensor 636 may include a video recording sensor and/or a camera chip. In one aspect of the present disclosure, the imager sensor 636 may comprise a complementary metal-oxide semiconductor (CMOS) array and may be capable of recording high definition (e.g., 722p, 1800p, 4K, etc.) video files. The camera 614 may include a separate camera processor (not shown in FIG. 6 for simplicity), or the processor(s) 610 may perform the camera processing functionality. The processor(s) 610 (and/or camera processor) may include an encoding and compression chip. In some embodiments, the processor(s) 610 (and/or the camera processor) may comprise a bridge processor. The processor(s) 610 (and/or the camera processor) may process video recorded by the image sensor 636 and/or audio recorded by the microphone(s) 628, and may transform this data into a form suitable for transfer by the communication module 612 to the network (Internet/PSTN) 512. In various embodiments, the camera 614 also includes memory, such as volatile memory that may be used when data is being buffered or encoded by the processor(s) 610 (and/or the camera processor). For example, in certain embodiments the camera memory may comprise synchronous dynamic random-access memory (SD RAM).

The camera 614 may further include an IR cut filter 638 that may comprise a system that, when triggered, configures the image sensor 636 to see primarily infrared light as opposed to visible light. For example, when the light sensor 618 detects a low level of ambient light (which may comprise a level that impedes the performance of the image sensor 636 in the visible spectrum), the light emitting components 640 may shine infrared light through an enclosure of the A/V device 102 out to the environment, and the IR cut filter 638 may enable the image sensor 636 to see this infrared light as it is reflected or refracted off of objects within the field of view of the doorbell. This process may provide the A/V device with the "night vision" function mentioned above.

With further reference to FIG. 6, the recording and communication A/V device 102 may comprise the light sensor 618 and the one or more light-emitting components 640, such as LED's. The light sensor 618 may be one or more sensors capable of detecting the level of ambient light of the surrounding environment in which the A/V device 102 may be located. The light-emitting components 640 may be one or more light-emitting diodes capable of producing visible light when supplied with power (e.g., to enable night vision). In some embodiments, when activated, the light-emitting components 640 illuminate a light pipe.

The A/V device 102 may further include one or more speaker(s) 630 and/or one or more microphone(s) 628. The speaker(s) 630 may be any electromechanical device capable of producing sound in response to an electrical signal input. The microphone(s) 628 may be an acoustic-to-electric transducer or sensor capable of converting sound waves into an electrical signal. In some embodiments, the A/V device 102 may include two or more microphone(s) 628 that are spaced from one another (e.g., located on different sides of the A/V device 102) to provide noise cancelling and/or echo cancelling for clearer audio. The speaker(s) 630 and/or microphone(s) 628 may be coupled to an audio CODEC 620 to enable digital audio received by client devices to be decompressed and output by the speaker(s) 630 and/or to enable audio data captured by the microphone(s) 628 to be compressed into digital audio data. The digital audio data may be received from and transmitted to client devices using the communication module 612 (in some embodiments, through one or more intermediary devices such as the hub device 502, the VA device 508, and/or one or more components of the network of servers/backend devices 520 as described in FIG. 5). For example, when a visitor (or intruder) who is present in the area about the A/V device 102 speaks, sound from the visitor (or intruder) is received by the microphone(s) 628 and compressed by the audio CODEC 620. Digital audio data is then sent through the communication module 612 to the network 512 via the user's network 518, routed by the backend server 524 and/or the backend API 526 and delivered to the client device(s) 514, 516 as described above in connection with FIG. 5. When the user speaks, after being transferred through the network 512, the user's network 518, and the communication module 612, the digital audio data from the user is decompressed by the audio CODEC 620 and emitted to the visitor through the speaker(s) 630.

With further reference to FIG. 6, the A/V device 102 may further include a power manager 644, which may comprise an integrated circuit including a processor core, memory, and/or programmable input/output peripherals. In some embodiments, the power manager 644 is configured to control, among other things, an amount of power drawn from an external power source (e.g., the AC power source 104, of FIG. 1), as well as an amount of supplemental power drawn from the battery 642 (e.g., an amount of power in addition to the power drawn from the external power source), to power the A/V recording and communication doorbell device 102. The power manager 644 may, for example, limit the amount of power drawn from the external power source so that a threshold power draw is not exceeded, in order to avoid causing the signaling device 608 to activate, as previously described. The power manager 644 may also be configured to control an amount of power drawn from the external power source and directed to the battery 642 for recharging of the battery 642.

In some embodiments, the A/V device 102 may be battery powered using the battery 642 and/or may be powered using a source of external AC power. In some embodiments, the AC power may have a voltage in the range of 110-220 VAC, for example. The incoming AC power may be received by an AC/DC adapter (not shown), which may convert the incoming AC power to DC (direct-current) and may step down the voltage from 110-220 VAC to a lower output voltage of about 12 VDC and an output current of about 2 A, for example. In various embodiments, the output of the AC/DC adapter is in a range from about 9 V to about 15 V and in a range from about 0.5 A to about 5 A. These voltages and currents are examples provided for illustration and are not intended to be limiting.

In some embodiments, power manager 644 is configured to cause the A/V recording and communication doorbell device 102 to draw power from the battery 642, when the transistor assembly 110 (not shown in FIG. 6) short-circuits the input power bus 120 (not shown in FIG. 6). As previously described, when the transistor assembly 110 is not short-circuiting the input power bus 120, the power manager 644 controls an amount of power drawn from the AC power source 104. When the transistor assembly 110 short-circuits the input power bus 120, however, the voltage across the first node 124 and the second node 126 is approximately zero, resulting in a short circuit in which power is not drawn (or a very minimal amount of power is drawn). Thus, when the transistor assembly 110 short-circuits the input power bus 120, the power manager 644 may draw at least a portion of power from the battery 642, in order for the A/V recording and communication doorbell device 102 to perform operations while the transistor assembly 110 short-circuits the input power bus 120.

However, in other embodiments, a battery 642 may not be included. In embodiments that include the battery 642, the A/V device 102 may include an integrated circuit (not shown) capable of arbitrating between multiple voltage rails, thereby selecting the source of power for the A/V device 102. The A/V device 102 may have separate power rails dedicated to the battery 642 and the AC power source. In one aspect of the present disclosure, the A/V device 102 may continuously draw power from the battery 642 to power the A/V device 102, while at the same time routing the AC power to the battery, thereby allowing the battery 642 to maintain a substantially constant level of charge. Alternatively, the A/V device 102 may continuously draw power from the AC power source to power the doorbell, while only drawing from the battery 642 when the AC power source is low or insufficient. Still, in some embodiments, the battery 642 comprises the sole source of power for the A/V device 102. In such embodiments, the components of the A/V device 102 (e.g., spring contacts, connectors, etc.) are not be connected to a source of AC power. When the battery 642 is depleted of its charge, it may be recharged, such as by connecting a power source to the battery 642 (e.g., using a USB connector).

In some embodiments, the processor(s) 610 serves as the control circuitry 112 to generate the first control signal $\phi_1$, the second control signal $\phi_2$, the third control signal $\phi_3$, and the fourth control signal $\phi_4$, to control the first transistor 132, the second transistor 134, the third transistor 136, and the fourth transistor 138, respectively.

Although not illustrated in FIG. 6 in some embodiments, the A/V device 102 may include one or more of an accelerometer, a barometer, a humidity sensor, and a temperature sensor. The accelerometer may be one or more sensors capable of sensing motion and/or acceleration. The one or more of the accelerometer, the barometer, the humidity sensor, and the temperature sensor may be located outside of a housing of the A/V device 102 so as to reduce interference from heat, pressure, moisture, and/or other stimuli generated by the internal components of the A/V device 102.

With further reference to FIG. 6, the A/V device 102 may include one or more motion sensor(s) 626. However, in some embodiments, the motion sensor(s) 626 may not be included, such as where motion detection is performed by the camera 614 or another device. The motion sensor(s) 626 may be any type of sensor capable of detecting and communicating the presence of an entity within their field of view. As such, the motion sensor(s) 626 may include one or more (alone or in combination) different types of motion sensors. For example, in some embodiments, the motion sensor(s) 626 may comprise passive infrared (PIR) sensors, which may be secured on or within a PIR sensor holder that may reside behind a lens (e.g., a Fresnel lens). In such an example, the PIR sensors may detect IR radiation in a field of view, and produce an output signal (typically a voltage) that changes as the amount of IR radiation in the field of view changes. The amount of voltage in the output signal may be compared, by the processor(s) 610, for example, to one or more threshold voltage values to determine if the amount of voltage in the output signal is indicative of motion, and/or if the amount of voltage in the output signal is indicative of motion of an entity that is to be captured by the camera 614 (e.g., motion of a person and/or animal may prompt activation of the camera 614, while motion of a vehicle may not). Although the above discussion of the motion sensor(s) 626 primarily relates to PIR sensors, depending on the embodiment, the motion sensor(s) 626 may include additional and/or alternate sensor types that produce output signals including alternative data types. For example, and without limitation, the output signal may include an amount of voltage change based on the presence of infrared radiation in a field of view of an active infrared (AIR) sensor, the output signal may include phase shift data from a microwave-type motion sensor, the output signal may include doppler shift data from an ultrasonic-type motion sensor, the output signal may include radio wave disturbance from a tomographic-type motion sensor, and/or the output signal may include other data types for other sensor types that may be used as the motion sensor(s) 626 of the A/V device 102.

In some embodiments, computer vision module(s) (CVM) 616 may be included in the A/V device 102 as the motion sensor(s) 626, in addition to, or alternatively from, other motion sensor(s) 626. For example, the CVM 616 may be a low-power CVM (e.g., Qualcomm Glance) that, by operating at low power (e.g., less than 2 mW of end-to-end power), is capable of providing computer vision capabilities and functionality for battery powered devices (e.g., the A/V device 102 when powered by the battery 642). The low-power CVM may include a lens, a CMOS image sensor, and a digital processor that may perform embedded processing within the low-power CVM itself, such that the low-power CVM may output post-processed computer vision metadata to the processor(s) 610 (e.g., via a serial peripheral bus interface (SPI)). As such, the low-power CVM may be considered to be one or more of the motion sensor(s) 626, and the data type output in the output signal may be the post-processed computer vision metadata. The metadata may include information such as the presence of a particular type of entity (e.g., person, animal, vehicle, parcel, etc.), a direction of movement of the entity, a distance of the entity from the A/V device 102, etc. In various embodiments, the motion sensor(s) 626 include a plurality of different sensor types capable of detecting motion such as PIR, AIR, low-power CVM, and/or cameras.

As indicated above, the A/V device 102 may include the CVM 616 (which may be the same as the above described low-power CVM 616 implemented as one or more motion sensor(s) 626, or may be additional to, or alternative from, the above described low-power CVM 616). For example, the A/V device 102, the hub device 502, the VA device 508, and/or one or more component of the network(s) of servers/backend devices 520 may perform any or all of the computer vision processes and functionalities described herein. In addition, although the CVM 616 is only illustrated as a component of the A/V device 102, the computer vision module 616 may additionally, or alternatively, be included as a component of the hub device 502, the VA device 508, and/or one or more components of the network of servers/backend devices 520. With respect to the A/V device 102, the CVM 616 may include any of the components (e.g., hardware) and/or functionality described herein with respect to computer vision, including, without limitation, one or more cameras, sensors, and/or processors. In some of the present embodiments, with reference to FIG. 6, the microphone(s) 628, the camera 614, the processor(s) 610, and/or the image sensor 636 may be components of the CVM 616. In some embodiments, the CVM 616 may include an internal camera, image sensor, and/or processor, and the CVM 616 may output data to the processor(s) 610 in an output signal, for example.

As a result of including the CVM 616, some of the present embodiments may leverage the CVM 616 to implement computer vision for one or more aspects, such as motion detection, object recognition, and/or facial recognition. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing—Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object.

Decision making—Making the final decision required for the application, for example match/no-match in recognition applications.

One or more of the present embodiments may include a vision processing unit (not shown separately, but may be a component of the CVM 616). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a manycore DSP (digital signal processor). But, like video processing units, vision processing units may have a focus on low precision fixed-point arithmetic for image processing.

Some of the present embodiments may use facial recognition hardware and/or software, as a part of the computer vision system. Various types of facial recognition exist, some or all of which may be used in the present embodiments.

Some face recognition algorithms identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based on template matching techniques applied to a set of salient facial features, providing a sort of compressed face representation.

Recognition algorithms can be divided into two main approaches, geometric, which looks at distinguishing features, or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 3D sensors to capture information about the shape of a face. This information is then used to identify distinctive features on the surface of a face, such as the contour of the eye sockets, nose, and chin.

One advantage of 3D face recognition is that it is not affected by changes in lighting like other techniques. It can also identify a face from a range of viewing angles, including a profile view. Three-dimensional data points from a face vastly improve the precision of face recognition. 3D research is enhanced by the development of sophisticated sensors that do a better job of capturing 3D face imagery. The sensors work by projecting structured light onto the face. Up to a dozen or more of these image sensors can be placed on the same CMOS chip—each sensor captures a different part of the spectrum.

Another variation is to capture a 3D picture by using three tracking cameras that point at different angles; one camera pointing at the front of the subject, a second one to the side, and a third one at an angle. All these cameras work together to track a subject's face in real time and be able to face detect and recognize.

Another emerging trend uses the visual details of the skin, as captured in standard digital or scanned images. This technique, called skin texture analysis, turns the unique lines, patterns, and spots apparent in a person's skin into a mathematical space.

Another form of taking input data for face recognition is by using thermal cameras, which may only detect the shape of the head and ignore the subject accessories such as glasses, hats, or make up.

Further examples of automatic identification and data capture (AIDC) and/or computer vision that can be used in the present embodiments to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe individuals. Biometric identifiers can be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present embodiments may use any one, or any combination of more than one, of the foregoing biometrics to identify and/or authenticate a person who is either suspicious or who is authorized to take certain actions with respect to a property or expensive item of collateral. For example, with reference to FIG. 6, the CVM 616, and/or the camera 614 and/or the processor(s) 610 may receive information about the person using any one, or any combination of more than one, of the foregoing biometrics.

With further reference to FIG. 6, in embodiments where the button 606 is a mechanical button (e.g., has a range of movement), the button 606 may make contact with a button actuator located within the video doorbell 102 when the button 606 is pressed. In embodiments where the button 606 is not mechanical (e.g., has no range of motion), the button 606 may include a capacitive touch button, a resistive touch button, a surface acoustic wave (SAW) button, an infrared (IR) button, an optical imaging button, an acoustic pulse recognition button, and/or a button that implements a low-power CVM for the detection of a person (e.g., a finger, hand, etc., of a person). When the button 606 is pressed, touched, and/or otherwise triggered, the processor(s) 610 may receive an output signal from the button 606 that may activate one or more functions of the video doorbell 102(*c*), such as causing the transistor assembly 110 to short-circuit the input power bus 102, and/or transmitting an output signal, using the communication module 612, to the signaling device 608 to cause the signaling device 608 to output a sound (e.g., via the wired 634(*b*) connection to the signaling device 608 and/or a wireless 634(*a*) connection to the signaling device 608). In addition, the processor(s) 610 may transmit an output signal (e.g., a user alert), using the communication module 612, to the client device(s) 514, 516 to indicate to the user(s) of the client device(s) 514, 516 that a person is present at the A/V device 510 (in some embodiments, via at least one of the hub device 502, the VA device 508, and/or one or more component of the network of servers/backend devices 520).

Although the A/V recording and communication device 102 (or A/V device 102) is referred to herein as an "audio/video" device, the A/V device 102 need not have both audio and video functionality. For example, in some embodiments, the A/V device 102 may not include the speakers 630, microphones 628, and/or audio CODEC. In such examples, the A/V device 102 may only have video recording and communication functionalities. In other examples, the A/V device 102 may only have the speaker(s) 630 and not the microphone(s) 628, or may only have the microphone(s) 628 and not the speaker(s) 630.

Processes 700 and 800, described below, are illustrated as a collection of blocks in a logical flow graph, which represent a sequence of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks may be combined in any order and/or in parallel to implement the processes. Additionally, any number of the described blocks may be optional and eliminated to implement the processes.

FIG. 7 is a flowchart illustrating an example process 700 performed by an A/V recording and communication doorbell device to transfer electrical power from an input power bus to an output power bus, according to various aspects of the present disclosure. The process, at block 702, detects a first DC voltage at a first node of an input power bus. For example, the processor(s) 610 may detect a first DC voltage at the first node 124 of the input power bus 120. At block 704, the process detects a second DC voltage at a second node of the input power bus. For example, the processor(s) 610 may detect a second DC voltage at the second node 126 of the input power bus 120. At block 706, the process determines whether the first DC voltage is greater than the second DC voltage. For example, the processor(s) 610 may determine whether the first DC voltage detected at the first node 124 is greater than the second DC voltage detected at the second node 126.

At block 708, the processor provides a first DC path between the input power bus and the output power bus to transfer electrical power between the input power bus and the output power bus, when the first DC voltage is greater than the second DC voltage. For example, the processor(s) 610 may generate the control signals $\phi_1$, $\phi_2$, $\phi_3$, and $\phi_4$ such that the first transistor 132 and the fourth transistor 138 operate in their respective on-states, and the second transistor 134 and third transistor 136 operate in their respective off-states, when the first DC voltage is greater than the second DC voltage, to provide the first DC path. At block 710, the processor provides a second DC path between the input power bus and the output power bus to transfer electrical power between the input power bus and the output power bus, when the first DC voltage is not greater than the second DC voltage. For example, the processor(s) 610 may generate the control signals $\phi_1$, $\phi_2$, $\phi_3$, and $\phi_4$ such that the first transistor 132 and the fourth transistor 138 operate in their respective off-states, and the second transistor 134 and third transistor 136 operate in their respective on-states, when the first DC voltage is not greater than the second DC voltage, to provide the second DC path.

Figure 8:
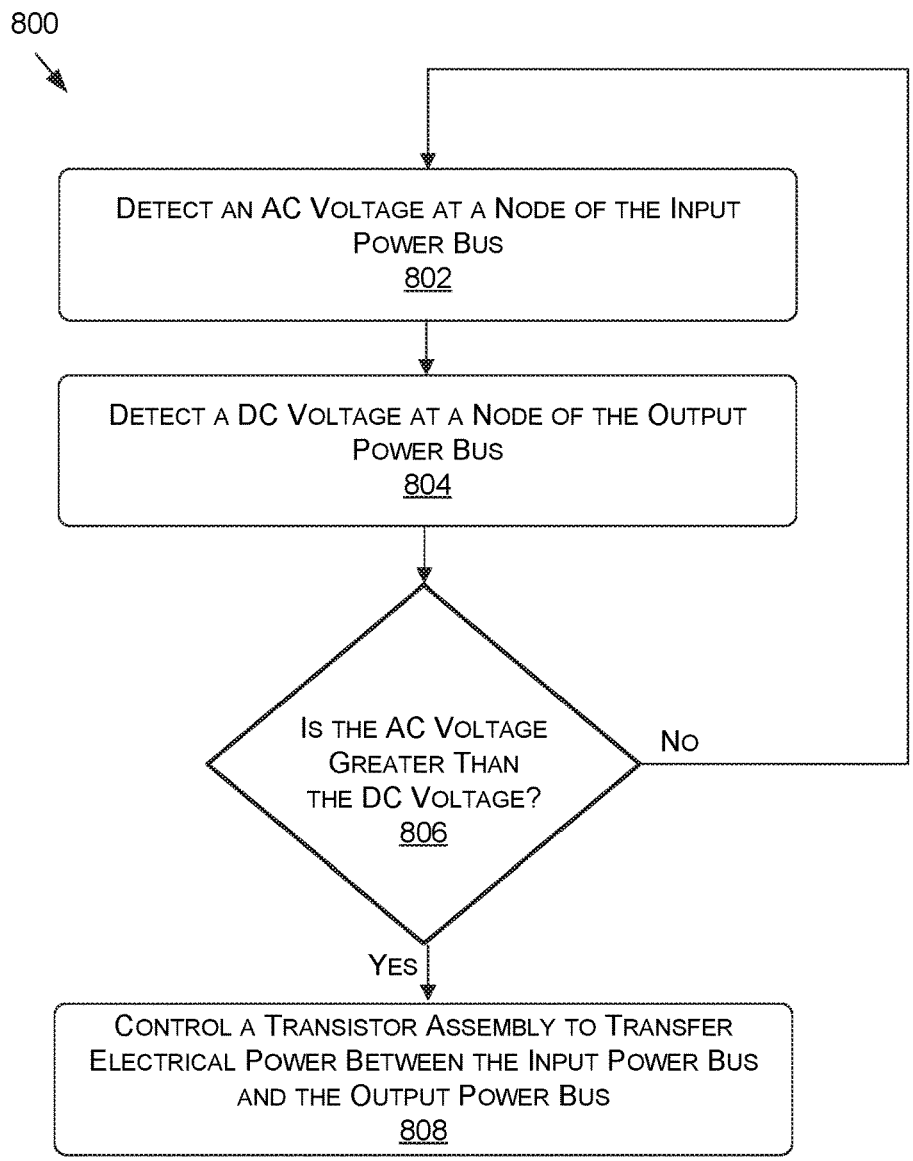
FIG. 8 is a flowchart illustrating another example process for transferring electrical power from an input power bus to an output power bus, according to various aspects of the present disclosure.

FIG. 8 is a flowchart illustrating an example process 800 performed by an A/V recording and communication doorbell device to transfer electrical power from an input power bus to an output power bus, according to various aspects of the present disclosure. The process, at block 802, detects an AC voltage at a node of the input power bus. For example, the processor(s) 610 may detect an AC voltage at the first node 124 of the input power bus 120. At block 804, the process detects a DC voltage at a node of an output power bus. For example, the processor(s) 610 may detect a DC voltage at the third node 128 of the output power bus 122.

At block 806, the process determines whether the AC voltage is greater than the DC voltage. For example, the processor(s) 610 may determine whether the AC voltage detected at the first node 124 is greater than the DC voltage detected at the third node 128. At block 808, the process controls a transistor assembly to transfer electrical power between the input power bus and the output power bus, upon determining that the AC voltage is greater than the DC voltage. For example, the processor(s) 610 may generate the control signals $\phi_1$, $\phi_2$, $\phi_3$, and $\phi_4$ to control the transistor assembly 110 such that the first transistor 132 and the fourth transistor 138 operate in their respective on-states, and the second transistor 134 and third transistor 136 operate in their respective off-states, upon determining that the AC voltage is greater than the DC voltage.

As used herein, the phrases "at least one of A, B and C," "at least one of A, B, or C," and "A, B, and/or C" are synonymous and mean logical "OR" in the computer science sense. Thus, each of the foregoing phrases should be understood to read on (A), (B), (C), (A and B), (A and C), (B and C), and (A and B and C), where A, B, and C are variables representing elements or features of the claim. Also, while these examples are described with three variables (A, B, C) for ease of understanding, the same interpretation applies to similar phrases in these formats with any number of two or more variables.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A method performed by an audio/video recording and communication doorbell device (A/V doorbell device) to transfer electrical power from an input power bus to an output power bus using a transistor assembly coupled between the input power bus and the output power bus, the method comprising:
   detecting a first direct current (DC)voltage at a first node of the input power bus;
     detecting a second DC voltage at a second node of the input power bus;
   comparing the first DC voltage to the second DC voltage;
     based on the comparing of the first DC voltage to the second DC voltage, causing the transistor assembly to provide a DC path between the input power bus and the output power bus, based on
       causing a first transistor of the transistor assembly to operate in an on-state, the first transistor being electrically coupled between the input power bus and the output power bus,
       causing a second transistor of the transistor assembly to operate in an off-state, the second transistor being electrically coupled between the input power bus and the output power bus,
       causing a third transistor of the transistor assembly to operate in an off-state, the third transistor being electrically coupled between the input power bus and the output power bus, and
       causing a fourth transistor of the transistor assembly to operate in an on-state, the fourth transistor being electrically coupled between the input power bus and the output power bus.

2. The method of claim 1, wherein:
   the output power bus comprises a third node and a fourth node,
     the first transistor is electrically coupled between the first node and the third node,
     the second transistor is electrically coupled between the second node and the third node,
     the third transistor is electrically coupled between the first node and the fourth node,
     and the fourth transistor is electrically coupled between the second node and the fourth node.

3. The method of claim 2 further comprising controlling the transistor assembly to emulate a diode electrically coupled across the input power bus to rectify the AC input power into a rectified DC output power to a signaling device.

4. The method of claim 3 further comprising:
   receiving an input to cause the signaling device to activate; and
   in response to receiving the input to cause the signaling device to activate, causing the transistor assembly to short-circuit the input power bus to provide the AC input power to the signaling device.

5. The method of claim 4 further comprising, when the transistor assembly short-circuits the input power bus, using an energy storage device of the A/V doorbell device to provide power to power management circuitry of the A/V doorbell device.

6. The method of claim 1, wherein:
   the output power bus comprises a third node and a fourth node,
     the first transistor is electrically coupled between the first node and the third node,
     the second transistor is electrically coupled between the second node and the third node,
     the third transistor is electrically coupled between the first node and the fourth node, and
     the fourth transistor is electrically coupled between the second node and the fourth node, the method further comprises causing the transistor assembly to provide a second path between the input power bus and the output power bus.

7. The method of claim 1, wherein, based on the first transistor and the fourth transistor being in the on-state, the first node of the input power bus is electrically coupled to a third node of the output power bus through the first transistor, and the second node of the input power bus is electrically coupled to a fourth node of the output power bus through the fourth transistor.

8. The method of claim 1, wherein a first one of the first transistor and the fourth transistor comprises an N-channel metal oxide semiconductor field effect transistor (MOSFET), and a second one of the first transistor and the fourth transistor comprises a P-channel MOSFET.

9. The method of claim 8, wherein the first transistor and the second transistor comprise enhancement mode MOSFET.

10. The method of claim 1 further comprising generating one or more regulated power supply voltages from electrical power at the output power bus.

11. A method performed by an audio/video recording and communication doorbell device to transfer electrical power from an input power bus to an output power bus, the method comprising:
   detecting a first direct current (DC) voltage at a first node of the input power bus;
   detecting a second DC voltage at a second node of the input power bus;
   determining whether the first DC voltage is greater than the second DC voltage; and
   when the first DC voltage is greater than the second DC voltage:
     causing a first transistor to operate in its on-state, the first transistor being electrically coupled between the input power bus and the output power bus,
     causing a second transistor to operate in its off-state, the second transistor being electrically coupled between the input power bus and the output power bus,
     causing a third transistor to operate in its off-state, the third transistor being electrically coupled between the input power bus and the output power bus, and
     causing a fourth transistor to operate in its on-state, the fourth transistor being electrically coupled between the input power bus and the output power bus.

12. The method of claim 11 further comprising, when the first DC voltage is not greater than the second DC voltage:
   causing the first transistor to operate in its off-state;
   causing the second transistor to operate in its on-state;
   causing the third transistor to operate in its on-state; and
   causing the fourth transistor to operate in its off-state.

13. The method of claim 11 further comprising:
   receiving an input to cause a signaling device to activate; and
   in response to receiving the input to cause the signaling device to activate, causing each of the first transistor and the second transistor to operate in its respective on-state, to short-circuit the input power bus to provide electrical power to the signaling device.

14. The method of claim 11 further comprising:
receiving an input to cause a signaling device to activate; and
in response to receiving the input to cause the signaling device to activate, causing each of the third transistor and the fourth transistor to operate in its respective on-state, to short-circuit the input power bus to provide electrical power to the signaling device.

15. The method of claim 6, the DC path and the second path having the same polarity.

16. The method of claim 15, the DC path and the second path configured such that either the third node is positive and the fourth node is negative, or the third node is negative and the fourth node is positive.

17. The method of claim 1, wherein causing the transistor assembly to provide the DC path includes:
controlling, via a first control signal, the first transistor to an on-state,
controlling, via a second control signal, the second transistor to an off-state,
controlling, via a third control signal, the third transistor to an off-state, and,
controlling, via a fourth control signal, the fourth transistor to an on-state,
such that current flows between the input power bus and the output power bus via the first transistor and the fourth transistor.

18. The method of claim 6, wherein causing the transistor assembly to provide the second path includes:
controlling, via a first control signal, the first transistor to an off-state,
controlling, via a second control signal, the second transistor to an on-state,
controlling, via a third control signal, the third transistor to an on-state, and,
controlling, via a fourth control signal, the fourth transistor to an off-state,
such that current flows between the input power bus and the output power bus via the second transistor and the third transistor.

19. An audio/video (A/V) recording and communication doorbell device, comprising:
an input power bus comprising a first node and a second node;
an output power bus comprising a third node and a fourth node;
a transistor assembly electrically coupled between the input power bus and the output power bus, the transistor assembly comprising
a first transistor electrically coupled between the first node and the third node,
a second transistor electrically coupled between the second node and the third node,
a third transistor electrically coupled between the first node and the fourth node,
and a fourth transistor electrically coupled between the second node and the fourth node, and
one or more electronically-readable media storing instructions that, when executed by one or more processors, cause the A/V recording and communication doorbell device to
detect a first direct current (DC) voltage at a first node of the input power bus,
detect a second DC voltage at a second node of the input power bus,
compare the first DC voltage to the second DC voltage, and
based on comparing the first DC voltage to the second DC voltage, provide a first circuit path between the input power bus and the output power bus by
controlling, via a first control signal, the first transistor to an on-state,
controlling, via a second control signal, the second transistor to an off-state,
controlling, via a third control signal, the third transistor to an off-state, and
controlling, via a fourth control signal, the fourth transistor to an on-state.

20. An audio/video (A/V) recording and communication doorbell device, comprising:
an input power bus comprising a first node and a second node;
an output power bus comprising a third node and a fourth node;
a transistor assembly electrically coupled between the input power bus and the output power bus, the transistor assembly comprising
a first transistor electrically coupled between the first node and the third node,
a second transistor electrically coupled between the second node and the third node,
a third transistor electrically coupled between the first node and the fourth node,
and a fourth transistor electrically coupled between the second node and the fourth node, and
one or more electronically-readable media storing instructions that, when executed by one or more processors, cause the A/V recording and communication doorbell device to
detect a first direct current (DC) voltage at a first node of the input power bus,
detect a second DC voltage at a second node of the input power bus, compare the first DC voltage to the second DC voltage, and
based on comparing the first DC voltage to the second DC voltage, provide a circuit path between the input power bus and the output power bus by
controlling, via a first control signal, the first transistor to an off-state,
controlling, via a second control signal, the second transistor to an on-state,
controlling, via a third control signal, the third transistor to an on-state, and,
controlling, via a fourth control signal, the fourth transistor to an off-state.

21. The method of claim 19, wherein a first one of the first transistor and the fourth transistor comprises an N-channel metal oxide semiconductor field effect transistor (MOSFET), and a second one of the first transistor and the fourth transistor comprises a P-channel MOSFET; and
wherein a first one of the second transistor and the third transistor comprises an N-channel metal oxide semiconductor field effect transistor (MOSFET), and a second one of the second transistor and the third transistor comprises a P-channel MOSFET.

22. The A/V recording and communication doorbell device of claim 19, wherein the instructions comprise instructions that, when executed by the one or more processors, cause the A/V recording and communication doorbell device to detect a third DC voltage at the first node of the input power bus, detect a fourth DC voltage at the second node of the input power bus, compare the third DC voltage to the fourth DC voltage, based on comparing the third DC voltage to the fourth DC voltage, provide a second circuit path between the input power bus and the output power bus by controlling, via a fifth control signal, the first transistor to an off-state, controlling, via a sixth control signal, the second transistor to an on-state, controlling, via a seventh control signal, the third transistor to an on-state, and, controlling, via an eighth control signal, the fourth transistor to an off-state.

23. The method of claim 20, wherein a first one of the first transistor and the fourth transistor comprises an N-channel metal oxide semiconductor field effect transistor (MOSFET), and a second one of the first transistor and the fourth transistor comprises a P-channel MOSFET; and wherein a first one of the second transistor and the third transistor comprises an N-channel metal oxide semiconductor field effect transistor (MOSFET), and a second one of the second transistor and the third transistor comprises a P-channel MOSFET.

* * * * *